(12) United States Patent
Kovacevic et al.

(10) Patent No.: US 9,407,926 B2
(45) Date of Patent: Aug. 2, 2016

(54) BLOCK-BASED STATIC REGION DETECTION FOR VIDEO PROCESSING

(71) Applicant: Intel Corporation, Santa Clara, CA (US)

(72) Inventors: Vladimir Kovacevic, Pancevo (RS); Zdravko Pantic, Belgrade (RS); Aleksandar Beric, Eindhoven (NL); Ramanathan Sethuraman, Bangalore (IN); Jean-Pierre Giacalone, Sophia Antipolis (FR); Anton Igorevich Veselov, Saint-Petersburg (RU); Marat Ravilevich Gilmutdinov, Saint-Petersburg (RU)

(73) Assignee: Intel Corporation, Santa Clara, CA (US)

( * ) Notice: Subject to any disclaimer, the term of this patent is extended or adjusted under 35 U.S.C. 154(b) by 44 days.

(21) Appl. No.: 14/287,967

(22) Filed: May 27, 2014

(65) Prior Publication Data

US 2015/0350666 A1    Dec. 3, 2015

(51) Int. Cl.

| | |
|---|---|
| *G06K 9/34* | (2006.01) |
| *H04N 19/503* | (2014.01) |
| *G06T 7/20* | (2006.01) |
| *H04N 19/176* | (2014.01) |
| *H04N 19/102* | (2014.01) |
| *H04N 19/14* | (2014.01) |
| *H04N 19/137* | (2014.01) |
| *H04N 19/85* | (2014.01) |
| *H04N 19/587* | (2014.01) |

(52) U.S. Cl.
CPC .......... *H04N 19/503* (2014.11); *G06T 7/2006* (2013.01); *H04N 19/102* (2014.11); *H04N 19/137* (2014.11); *H04N 19/14* (2014.11); *H04N 19/176* (2014.11); *H04N 19/85* (2014.11); *H04N 19/587* (2014.11)

(58) Field of Classification Search
USPC .......... 382/173, 171, 236, 103; 345/419, 502; 348/222.1, 230.1, 231.6; 375/240.13
See application file for complete search history.

(56) References Cited

U.S. PATENT DOCUMENTS

| | | | |
|---|---|---|---|
| 7,865,015 B2 * | 1/2011 | Chen | ..................... G06T 7/2006 |
| | | | 382/173 |
| 8,532,189 B2 | 9/2013 | Kervec et al. | |

(Continued)

OTHER PUBLICATIONS

Daehyun Kim and Kwanghoon Sohn, "Static Text Region Detection in Video Sequences Using Color and Orientation Consistencies", IEEE, 2008 (4 pages).

Mainak Biswas and Truong Nguyen, "A Novel Motion Estimation Algorithm Using Phase Plane Correlation for Frame Rate Conversion", IEEE, 2002 (5 pages).

(Continued)

*Primary Examiner* — Anh Do
(74) *Attorney, Agent, or Firm* — Hanley, Flight & Zimmerman, LLC

(57) ABSTRACT

Methods, apparatus, systems and articles of manufacture to perform block-based static region detection for video processing are disclosed. Disclosed example video processing methods include segmenting pixels in a first frame of a video sequence into a first plurality of pixel blocks. Such example methods can also include processing the first plurality of pixel blocks and a second plurality of pixel blocks corresponding to a prior second frame of the video sequence to create, based on a first criterion, a map identifying one or more static pixel blocks in the first plurality of pixel blocks. Such example methods can further include identifying, based on the map, a static region in the first frame of the video sequence.

25 Claims, 14 Drawing Sheets

(56) References Cited

U.S. PATENT DOCUMENTS

| | | |
|---|---|---|
| 8,619,861 B2 | 12/2013 | Zuo et al. |
| 8,947,551 B2 * | 2/2015 | Zerwick ................ H04N 19/88 348/222.1 |
| 2010/0034420 A1 | 2/2010 | Xiong et al. |
| 2010/0104202 A1 | 4/2010 | Chen et al. |
| 2014/0002732 A1 | 1/2014 | Gilmutdinov et al. |
| 2014/0010302 A1 | 1/2014 | Ahuja et al. |

OTHER PUBLICATIONS

Wikipedia, "Sobel Operator", <http://en.wikipedia.org/wiki.Sobel_operator.com>, last modified on Dec. 27, 2013 (6 pages).

International Searching Authority, "International Search Report", issued in connection with International Patent Application No. PCT/US2015/028025, mailed Aug. 10, 2015 (3 pages).

International Searching Authority, "Written Opinion", issued in connection with International Patent Application No. PCT/US2015/028025, mailed Aug. 10, 2015 (8 pages).

* cited by examiner

BLOCK-BASED STATIC REGION DETECTION FOR VIDEO PROCESSING

FIELD OF THE DISCLOSURE

This disclosure relates generally to video processing and, more particularly, to block-based static region detection for video processing.

BACKGROUND

In video processing, static region detection involves identifying one or more regions of a video frame that are static, or unchanging, relative to a prior video frame in a video sequence. By identifying static region(s) in a video frame, such static region(s) can then be preserved and/or taken advantage of during subsequent video processing operations, such as frame rate up-conversion and/or video compression.

Figure 1:
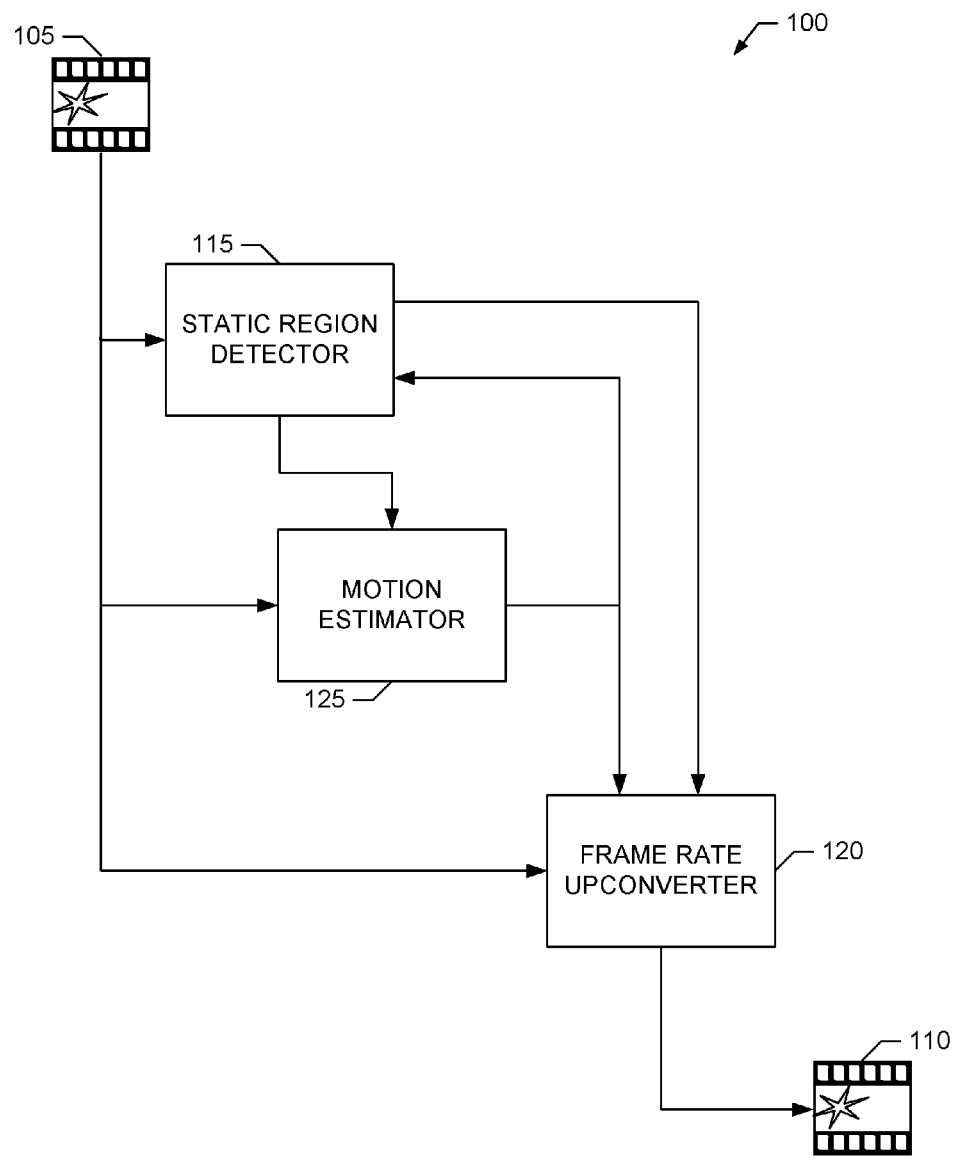
FIG. 1 is a block diagram of an example video processing system including a static region detector employing block-based static region detection as disclosed herein.

The material disclosed herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, wherever possible, the same reference numbers will be used throughout the drawing(s) and accompanying written description to refer to the same or like parts, elements, etc.

DETAILED DESCRIPTION

Methods, apparatus, systems and articles of manufacture (e.g., physical storage media) to implement block-based static region detection for video processing are disclosed herein. Some example video processing methods disclosed herein include segmenting pixels in a first frame of a video sequence into a first plurality of pixel blocks. Some such example methods also include processing the first plurality of pixel blocks and a second plurality of pixel blocks corresponding to a prior second frame of the video sequence to create, based on one or more criteria, a map identifying one or more static pixel blocks in the first plurality of pixel blocks. Some such example methods further include identifying, based on the map, one or more static regions in the first frame of the video sequence.

In some disclosed example methods, the processing of the first plurality of pixel blocks and the second plurality of pixel blocks include evaluating the first plurality of pixel blocks and the second plurality of pixel blocks based on a first criterion to determine a first static block identification result. Some such example methods also include evaluating the first plurality of pixel blocks and the second plurality of pixel blocks based on a second criterion to determine a second static block identification result. Some such example methods further include combining the first and second static block identification results to create the map identifying the one or more static pixel blocks in the first plurality of pixel blocks.

In some disclosed example methods, the one or more criteria include a sum of absolute differences criterion. In such example methods, the processing of the first plurality of pixel blocks and the second plurality of pixel blocks includes computing a sum of absolute differences between pixels in a first pixel block of the first plurality of pixel blocks and corresponding pixels in a corresponding second pixel block of the second plurality of pixel blocks. Some such example methods also include determining whether the first pixel block is a static block based on comparing the sum of absolute differences to a threshold.

In some disclosed example methods, the one or more criteria include an edge count criterion. In some such example methods, the processing of the first plurality of pixel blocks and the second plurality of pixel blocks includes determining an edge map identifying edges in the first frame of the video sequence. Some such example methods also include counting a number of pixels in a first pixel block of the first plurality of pixel blocks associated with the edges identified in the edge map. Some such example methods further include determining whether the first pixel block is a static block based on comparing the number to a threshold.

In some disclosed example methods, the one or more criteria include an edge correspondence criterion. In some such example methods, the processing of the first plurality of pixel blocks and the second plurality of pixel blocks includes determining a first edge map identifying edges in the first frame of the video sequence. Some such example methods also include identifying first edge pixels in a first pixel block of the first plurality of pixel blocks, the first edge pixels being associated with the edges identified in the first edge map. Some such example methods further include determining a number of first edge pixels not having edge correspondence with respective second edge pixels in a corresponding second pixel block of the second plurality of pixel blocks. For example, two edge pixels can have edge correspondence when the two edge pixels have a same frame location and are associated with a same edge orientation. Some such example methods additionally include determining whether the first pixel block is a static block based on comparing the number to a threshold.

In some disclosed example methods, the first frame has multiple video components, the first plurality of pixel blocks is associated with a first video component plane, and the map is a first map. Some such example methods include segmenting the pixels in the first frame of the video sequence into a third plurality of pixel blocks associated with a second video component plane different from the first video component plane. Some such example methods also include processing the third plurality of pixel blocks and a fourth plurality of pixel blocks corresponding to the second video component plane of the prior second frame of the video sequence to create, based on the one or more criteria, a second map identifying one or more static pixel blocks in the third plurality of pixel blocks. Some such example methods further include identifying, based on the first and second maps, the one or more static regions in the first frame of the video sequence. In some such examples, the identifying of the one or more static regions in the first frame includes combining the first map and the second map to determine an overall map identifying one or more static pixel blocks in the first frame of the video sequence.

In some disclosed example methods, the map is a first map. Some such example methods include segmenting the pixels in the first frame of the video sequence into a third plurality of pixel blocks such that ones of the third plurality of pixel blocks partially overlap ones of the first plurality of blocks. Some such example methods also include processing the third plurality of pixel blocks and a fourth plurality of pixel blocks corresponding to the prior second frame of the video sequence to create, based on the one or more criteria, a second map identifying one or more static pixel blocks in the third plurality of pixel blocks. In some such examples, ones of the fourth plurality of pixel blocks partially overlap ones of the second plurality of blocks. Some such example methods further include identifying, based on the first and second maps, the one or more static regions in the first frame of the video sequence. In some such examples, the identifying of the one or more static regions in the first frame includes combining the first map and the second map to determine an overall map identifying one or more static pixel sub-blocks in the first frame of the video sequence. For example, a first sub-block in the first frame is included in a first one of the first plurality of pixel blocks and a first one of the third plurality of blocks, and the overall map has finer resolution than the first and second blocks. Some such example methods also include identifying the one or more static regions in the first frame of the video sequence based on the overall map.

In some disclosed example methods, the map is a first map. Such example method can also include adjusting a first one of the one or more criteria based on at least one of (1) a determined correlation between the first and second frames of the video sequence, or (2) evaluation of a prior second map identifying one or more static pixel blocks in the second plurality of pixel blocks corresponding to the prior second frame of the video sequence.

These and other example methods, apparatus, systems and articles of manufacture (e.g., physical storage media) to implement block-based static region detection for video processing are disclosed in greater detail below.

As mentioned above, static region detection involves identifying one or more regions of a video frame that are static, or unchanging, relative to a prior video frame in a video sequence. An identified static region can then be preserved and/or taken advantage of, if appropriate, during subsequent video processing operations, such as frame rate up-conversion and/or video compression. However, false detection of a static region in an image frame can yield undesirable artifacts in moving regions of a video sequence. Similarly, missed detection of a static region or, in other words, erroneous prediction of motion in what is actually a static region can yield undesirable artifacts in motionless regions of a video sequence. As discussed in further detail below, examples disclosed herein employ block-based static region detection and, in at least some examples, multiple detection criteria, which may reduce the likelihood of false and/or missed detection of static region(s) in a video sequence.

Turning to the figures, a block diagram of at least a portion of an example video processing system 100 employing block-based static region detection as disclosed herein is illustrated in FIG. 1. The video processing system 100 of the illustrated example processes an example input video sequence 105 to produce an example output video sequence 110. The video sequences 105 and 110 each include a series of sequential video frames (also referred to as images, images frames, etc.). A video frame in the video sequences 105 or 110 can include one or more video components, with each video component corresponding to a respective component plane of the video frame. For example, to support color video, a video frame in the video sequences 105 or 110 can include a luminance component (also referred to as the Y component) and two chrominance components (also referred to as the U and V components), and such a video frame can be decomposed into a luminance component plane and two chrominance component planes. Other video frame representations having different components, and/or more or fewer components, can be supported by the video processing system 100 and the block-based static region detection techniques disclosed herein.

Figure 4:
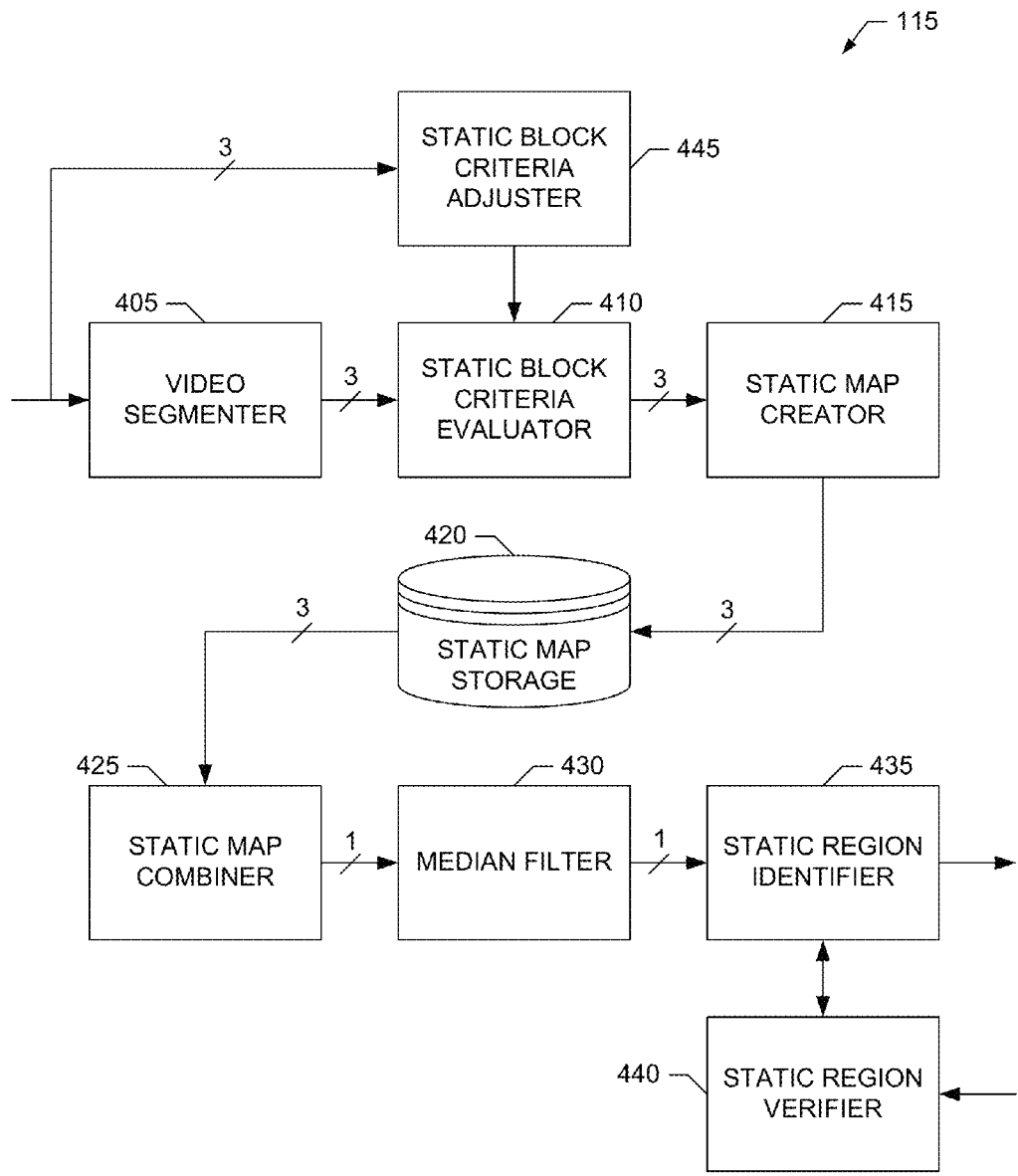
FIG. 4 is a block diagram illustrating an example implementation of the static region detector of FIG. 1.

In the illustrated example of FIG. 1, the video processing system 100 includes an example static region detector 115 implementing block-based static region detection, as disclosed herein, to detect one or more static regions in a video frame of the input video sequence 105. In general, a static region of a video frame of the input video sequence 105 is a region of the video frame that is static, or unchanging, relative to a preceding video frame in the input video sequence 105. Conversely, a region of the video frame that changes relative to the same region of the preceding video frame in the input video sequence 105 is considered to be a region associated with motion. An example implementation of the static region detector 115 is illustrated in FIG. 4, which is described in further detail below.

The static region(s) identified by the static region detector 115 of the illustrated can be preserved during subsequent video processing operations (e.g., to improve video quality by avoiding the introduction of artifacts into the static region(s)). The identified static region(s) can additionally or alternatively be taken advantage of during subsequent video processing operations (e.g., to improve video compression performance by taking advantage of redundancies in the video sequence). For example, in the illustrated example of FIG. 1, the static region detector 115 provides information identifying the detected static region(s) of a video frame in the input video sequence 105 to an example frame rate upconverter 120. The frame rate of a video sequence refers to the number of frames of the video sequence that correspond to a given interval of time. For example, frame rate can be expressed in units of frames per second (fps), Hertz (Hz), etc., or any other appropriate units. Typical video frame rates can include, for example, 15 fps (or 15 Hz), 30 fps (or 30 Hz), 60 fps (or 60 Hz), 120 fps (or 120 Hz), etc. In general, frame rate upconversion involves processing the input video sequence 105, which has a first frame rate (e.g., 60 fps or 60 Hz), to produce an output video sequence 110 representing the same video imagery by having a higher, second frame rate (e.g., 120 fps or 120 Hz). The frame rate upconverter 120 of the illustrated example implements any number and/or type(s) of frame rate upconversion techniques to increase the frame rate between the input video sequence 105 and the output video sequence 110. For example, the frame rate upconverter 120 can implement interpolation to insert a new video frame between two existing frames of the input video sequence 105, prediction to predict a new video frame from one or more existing frames of the input video sequence 105, other techniques, or any combination thereof.

Figure 2B:
FIGS. 2A-B and 3A-B illustrates example image artifacts that may be created by prior video processing systems not employing block-based static region detection as disclosed herein.
Figure 2A:
Figure 3A:
Figure 3B:

In the illustrated example of FIG. 1, the frame rate upconverter 120 receives the static region(s) identified by the static region detector 115 in video frames of the input video sequence 105. The example frame rate upconverter 120 can then use this information to preserve the static regions in the video frames of the input video sequence 105 during upconversion to form the output video sequence 110. Examples of image artifacts that might be introduced by frame rate upconversion into the output video sequence 110 if static regions are not properly preserved are illustrated in FIGS. 2A-B and 3A-B. For example, FIG. 2A depicts an example video frame of the example input video sequence 105. FIG. 2B depicts a corresponding upconverted frame of the example output video sequence 110, which exhibits noticeable artifacts (e.g., such as blurring) that may be caused by frame rate upconversion exhibiting missed detection of static regions (or, in other words, false detection of motion). FIG. 3A depicts an example video frame of another example input video sequence 105. FIG. 3B depicts a corresponding upconverted frame of the example output video sequence 110, which exhibits noticeable artifacts (e.g., such as blocking) that may be caused by frame rate upconversion exhibiting false detection of static regions. Block-based static region detection, as disclosed herein and employed by the example static region detector 115 of FIG. 1, reduces the likelihood of false and/or missed detection of static region(s) in the input video sequence 105, which s reduces the likelihood of the output video sequence 110 exhibiting the undesirable artifacts illustrated in the examples of FIGS. 2B and/or 3B.

In the illustrated example, the video processing system 100 further includes an example motion estimator 125. The motion estimator 125 of the illustrated example determines, using any appropriate technique or combination(s) of techniques, motion data to characterize the motion between successive video frames of the input video sequence 105. For example, the motion data determined by the motion estimator 125 can include, but is not limited to, one or more motion vectors, reference indices, inter directions, etc. In the illustrated example of FIG. 1, the motion data determined by the motion estimator 125 can be used by the frame rate upconverter 120 to interpolate, predict and/or otherwise create new frames for inclusion in the output sequence 110 that take into account the motion exhibited in the video frames of the input video sequence 105. In some examples, the motion estimator 125 can use static region information provided by the static region detector 115 to improve the accuracy, quality, etc., of the determined motion data. Additionally or alternatively, in some examples, the static region detector 115 can use the motion data determined by the motion estimator 125 to verify the correctness of the static region(s) detected using block-based static region detection, as disclosed herein. Operation of the static region detector 115 to verify static region detection using motion data is disclosed in further detail below.

Although block-based static region detection is described in the context of the example video system 100 of FIG. 1, block-based static region detection as disclosed herein is not limited thereto. For example, block-based static region detection as disclosed herein is not limited to being used with frame rate upconversion, but can be used with additional or alternative video processing techniques, such as video compression, etc.

A block diagram of an example implementation of the static region detector 115 of FIG. 1 is illustrated in FIG. 4. The example static region detector 115 of FIG. 4 employs block-based static region detection, which can be more robust and yield a lower likelihood (or probability) of false and/or missed static region detections than prior static region detection techniques. Also, block-based static region detection as disclosed herein lends itself to a higher level of vectorization than prior techniques involving comparison of individual image pixels, which can make for an economical implementation of the static region detector 115 in hardware.

In the illustrated example, the static region detector 115 of FIG. 4 performs static region detection independently on the different video component planes of a video frame in the input video sequence 105. For example, the static region detector 115 of FIG. 4 performs static region detection independently for the luminance (Y) plane and the two chrominance (UN) planes of the input video frame. As disclosed in further detail below, the example static region detector 115 of FIG. 4 segments the video frames of the input video sequence 105 into pixel blocks and utilizes the three video components (e.g., one luminance and two chrominance) of two successive video frames (e.g., a current frame and a previous frame) of the input video sequence 105 to create individual binary static maps for each of the video component planes undergoing processing. Each bit in a binary static map for a given video component plane of a video frame (e.g., the current video frame being processed) corresponds to a respective pixel block in the given video component plane of the segmented video frame and indicates whether the corresponding pixel block is a static block or not. In some examples, the same static block detection criteria are used for static block detection in each of the video component planes, whereas in other examples, different static block detection criteria may be used for different video component planes. Example static block detection criteria that can be employed by the static region detector 115 are disclosed in further detail below.

In the illustrated example of FIG. 4, the static region detector 115 combines the binary static maps for the different video component planes into an overall binary static map identifying the static pixel blocks in a video frame (e.g., the current video frame being processed). In some examples, the static region detector 115 post-processes the overall binary static map to improve detection reliability. The identified static pixel blocks can then be grouped into static regions and/or provided by static region detector 115 to other video processing modules, such as the example frame rate upconverter 120.

In some examples, further processing enhancements are implemented by the example static region detector 115 of FIG. 4.

The example static region detector 115 of FIG. 4 includes an example video segmenter 405 to segment video frames of the input video sequence 105 into blocks of pixels, also referred to as pixel blocks. For example, the video segmenter 405 can segment an input video frame into pixel blocks each containing 16×16 pixels, which is suitable for supporting motion estimation algorithms for video sequences having 1080 pixels of vertical resolution (1080p). In other examples, the video segmenter 405 can segment an input video frame into pixel blocks having other sizes (e.g., 4×4 pixels, 8×8 pixels, etc.). Also, in some examples, the size of the pixel blocks determined by the video segmenter 405 is programmable or otherwise configurable (e.g., via a user input). In the illustrated example of FIG. 4, the video segmenter 405 segments each video component plane (e.g., the luminance plane and the two chrominance planes) to form three segmented video component planes of pixel blocks for a given input video frame (e.g., represented by the "3" labeling the output line from the video segmenter 405 in the illustrated example of FIG. 4).

Figure 6:
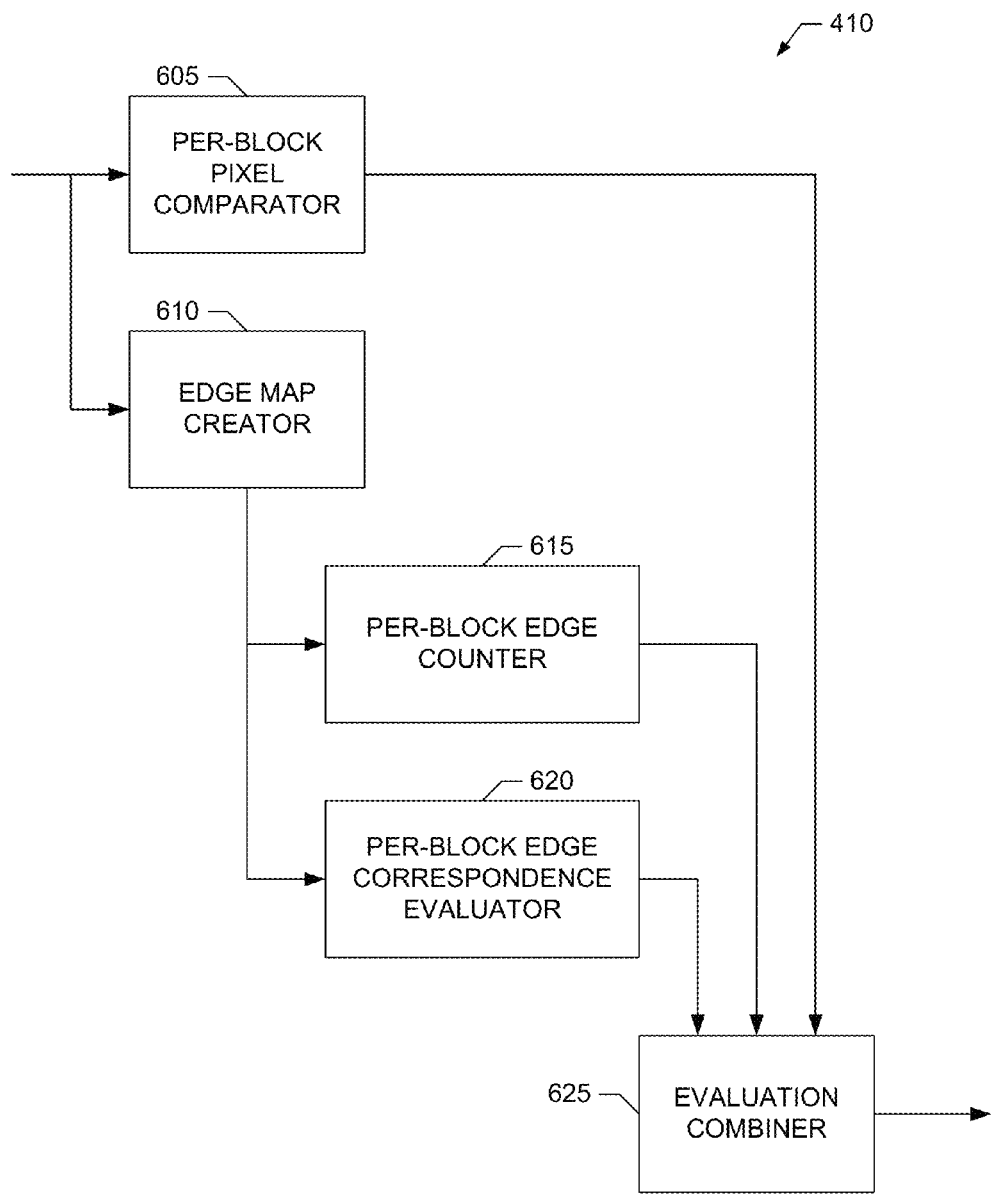
FIG. 6 is a block diagram of an example static block criteria evaluator that can be used to implement the example static region detector of FIG. 4.

The example static region detector 115 of FIG. 4 also includes an example static block criteria evaluator 410 to process the segmented video component planes provided by the video segmenter 405 to identify zero or more static pixel blocks in the respective video component planes of an input video frame. In the illustrated example, to identify zero or more static blocks in a current (e.g., first) video frame of the input video sequence 105, the static block criteria evaluator 410 evaluates the pixel blocks in the current (e.g., first) video frame and corresponding pixel blocks in a preceding (e.g., second) video frame of the input video sequence 105 against one or more static block detection criteria. If the static block detection criteria are satisfied for a given current/preceding pixel block pair, the static block criteria evaluator 410 indicates that the corresponding pixel block in the current video frame is a static block. Examples of static block detection criteria that can be evaluated by the static block criteria evaluator 410 are disclosed in further detail below. In the illustrated example of FIG. 4, the static block criteria evaluator 410 performs static block evaluation individually for each video component plane (e.g., the luminance plane and the two chrominance planes) segmented by the video segmenter 405. Thus, for a given pixel block of a video frame, the static block criteria evaluator 410 yields separate static block detection results for each of the video component planes of a given input video frame (e.g., represented by the "3" labeling the output line from the static block criteria evaluator 410 in the illustrated example of FIG. 4). An example implementation of the static block criteria evaluator 410 is illustrated in FIG. 6, which is described in further detail below.

The example static region detector 115 of FIG. 4 further includes an example static map creator 415 to create a static map identifying zero or more static pixel blocks determined by the example static block criteria evaluator 410. For example, the static map creator 415 can create a separate static map for each video component plane (e.g., the luminance plane and the two chrominance planes) segmented by the video segmenter 405 (e.g., represented by the "3" labeling the output line from the static map creator 415 in the illustrated example of FIG. 4). Each entry in a static map for a given video component plane of a video frame (e.g., the current video frame being processed) corresponds to a respective pixel block in the given video component plane of the segmented video frame and indicates whether the corresponding pixel block is a static block or not. For example, the static maps created by the static map creator 415 can be binary static maps in which each entry of the map is a bit having a logic value of "1" or "0." In such examples, for a given pixel block in a given video component plane of a segmented input video frame, the static map creator 415 can set the corresponding bit in the binary static map for the given video component plane to one of the logic values (e.g., "1" or "0") to indicate that the given pixel block is a static block, and can set the corresponding bit in the binary static map for the given video component plane to the other logic value (e.g., "0" or "1") to indicate that the given pixel block is not a static block. In the illustrated example of FIG. 4, the static map creator 415 sets the entries of its static maps according to the evaluation results provided by the static block criteria evaluator 410.

In the illustrated example of FIG. 4, the static region detector 115 includes an example static map storage 420 to store the static maps created by the example static map creator 415 for the different video component planes of an input video frame being processed. For example, if the example video segmenter 405 segments an input video frame over three video component planes (e.g., one luminance plane and two chrominance planes), then the static map storage 420 stores three static maps for the input video frame, one static map for each of the different video component planes. The example static map storage 420 can be implemented by any number and/or type(s) of memories, storage devices, etc., such as, but not limited to, the memory 1514 and/or the storage device 1528 of the example processor platform 1500, which is described in further detail below.

The example static region detector 115 of FIG. 4 includes an example static map combiner 425 to combine the different static maps for a given (e.g., current) input video frame into an overall static map identifying the zero or more static pixel blocks in the given (e.g., current) input video frame. For example, the static map combiner 425 of FIG. 4 retrieves, from the example static map storage 420, the static maps created by the example static map creator 415 for the three different video component planes (e.g., one luminance and two chrominance) of the given (e.g., current) input video frame (e.g., represented by the "3" labeling the input line into the static map combiner 425 in the illustrated example of FIG. 4). The static map combiner 425 then combines the static maps for the different video component planes into an overall static map identifying the zero or more static pixel blocks in the given (e.g., current) input video. Such combining is referred to herein as "inter-component combining" because the static map combining is performed across two or more different video component planes. Example techniques that can be used by the static map combiner 425 to combine static maps for different video component planes into an overall static map are disclosed in further detail below.

In some examples, the static map combiner 425 of FIG. 4 additionally or alternatively implements "intra-component combining," which refers to combining multiple static maps that are associated with the same video component plane. Intra-component combining can be used, for example, when the example video segmenter 405 is configured to segment an input video frame of the input video sequence multiple times, with the pixel blocks in each segmentation iteration being offset relative to the pixel blocks associated with other segmentation iteration(s). In such examples, the pixel blocks determined by the video segmenter 405 for the input video frame in one segmentation iteration will partially overlap the pixel blocks determined by the video segmenter 405 in other segmentation iteration(s). The overlapping block regions across different segmentation iterations define smaller sub-blocks. Thus, the resulting overall static map determined by the static map combiner 425 performing intra-component combining of the static maps corresponding to the different segmentation iterations will have higher resolution corresponding to the smaller sub-block size. Because the pixel sub-blocks represented in the overall static map determined by the static map combiner 425 in such an example are each associated with multiple static block decisions corresponding to the multiple pixel blocks overlapping a given sub-block, the accuracy of a static block decision for a given sub-block can be improved by combining the decisions made for the multiple pixel blocks overlapping the given sub-block.

Figure 5:
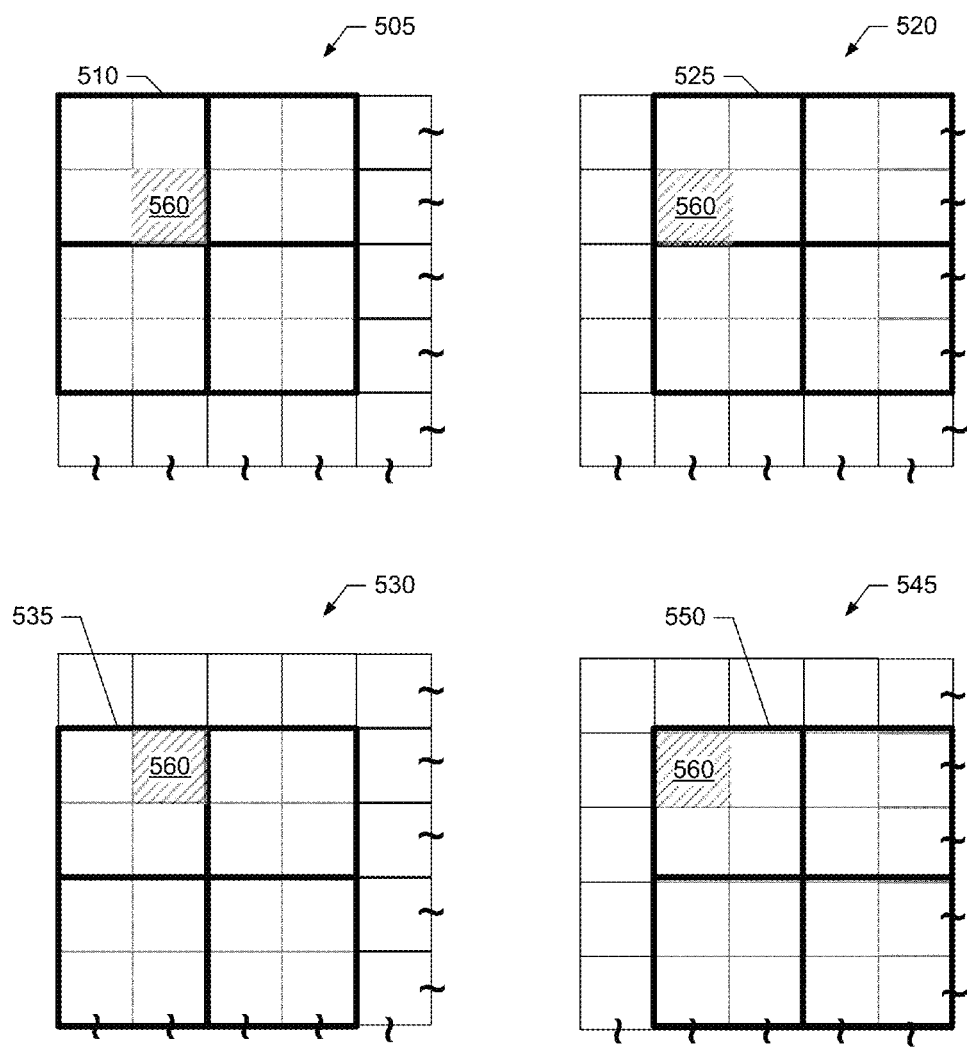
FIG. 5 illustrates an example operation of the example static region detector of FIG. 4.

An example of overlapping video frame segmentation, which can be performed by the example video segmenter 405, and corresponding intra-component combining, which can be performed by the example static map combiner 425, is illustrated in FIG. 5. The example of FIG. 5 corresponds to an example scenario in which the video segmenter 405 segments an input video frame over multiple iterations such that pixel blocks in successive iterations are offset by 50% (or half) of the pixel block size in either the horizontal or vertical directions. For example, in a first example segmentation 505 illustrated in FIG. 5, the video segmenter 405 begins segmenting in the top left corner of the input video frame, which yields pixel blocks 510, etc., having a size of 16×16 pixels, or some other size. In a second example segmentation 520 illustrated in FIG. 5, the video segmenter 405 offsets segmentation by 50% of the pixel block size (e.g., 8 pixels in this example) in the horizontal direction relative to the first example segmentation 505 to yield pixel blocks 525, etc. In a third example segmentation 530 illustrated in FIG. 5, the video segmenter 405 offsets segmentation by 50% of the pixel block size (e.g., 8 pixels in the example) in the vertical direction relative to the first example segmentation 505 to yield pixel blocks 535, etc. In a fourth example segmentation 545 illustrated in FIG. 5, the video segmenter 405 offsets segmentation by 50% of the pixel block size (e.g., 8 pixels in the example) in the horizontal direction relative to the third example segmentation 505 to yield pixel blocks 550, etc.

Figure 9:
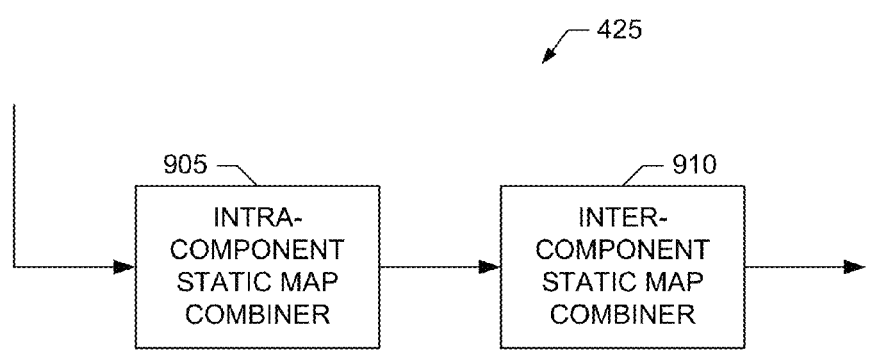
FIG. 9 is a block diagram of an example static map combiner that can be used to implement the example static region detector of FIG. 4.

In the example of FIG. 5, the example static block criteria evaluator 410 and the static map creator 415 perform static block criteria evaluation and static map creation for each of the different segmentation iterations 505, 520, 530, 545. For example, the static map creator 415 of the illustrated example outputs three static maps corresponding to the three different video component planes resulting from the first example segmentation 505, three static maps corresponding to the three different video component planes resulting from the second example segmentation 520, three static maps corresponding to the three different video component planes resulting from the third example segmentation 530, three static maps corresponding to the three different video component planes resulting from the fourth example segmentation 545, etc. As shown in the example of FIG. 5, the pixel block 510 from the first example segmentation 505, the pixel block 525 from the second example segmentation 520, the pixel block 535 from the third example segmentation 530 and the pixel block 550 from the fourth example segmentation 545 all overlap an example sub-block 560 (e.g., which is 8×8 pixels in the illustrated example). In the illustrated example of FIG. 5, the static map combiner 425 can perform intra-component combining to combine, for a given video component plane, the different static maps corresponding to the different example segmentations 505, 520, 530 and 545 to determine a single combined static map for the given video component plane having an entry for the sub-block 560. For example, the entry for the sub-block 560 in the combined static map for a given video component plane would be a combination of the entries for the pixel block 510, 525, 535 and 550 in the different static map created for the different segmentation iterations 505, 520, 530 and 545. An example implementation of the static map combiner 425 of FIG. 4 is illustrated in FIG. 9, which is described in further detail below.

Returning to FIG. 4, the example static map combiner 425 combines the static maps for different video component planes of a given (e.g., current) input video frame, and/or for different segmentations of the given (e.g., current) input video frame, to yield a single, overall static map identifying the static block(s), if any, in the given (e.g., current) input video frame (e.g., represented by the "1" labeling the output line from the static map combiner 425 in the illustrated example of FIG. 4). In some examples, the static region detector 115 of FIG. 4 includes an example media filter 430 to filter the overall static map for the given (e.g., current) input video frame to remove spurious entries identifying isolated static or non-static block(s). The example median filter 430 can implement any type of median filter and/or other filtering/post-processing to remove spurious static/non-static block identifications from the overall static map output by the static map combiner 425. In some examples, in addition to or as an alternative to processing the overall static map output by the static map combiner 425, the median filter 430 can be configured to filter/process the static maps determined by the static map creator 415 for the individual video component planes of the given (e.g., current) input video frame.

In the illustrated example of FIG. 4, the static region detector 115 includes an example static region identifier 435 to output information identifying the static region(s), if any, indicated by the overall static map for a given (e.g., current) input video frame. For example, the static region identifier 435 can output location information identifying the static blocks indicated in the overall static map for the given (e.g., current) input video frame. In some examples, the region identifier 435 combines static pixels blocks indicated in the overall static map for the given (e.g., current) input video frame to form larger static regions, and then outputs location/size/shape information specifying the static regions in the given (e.g., current) input video frame.

In some examples, the static region detector 115 of FIG. 4 includes an example static region verifier 440 to verify the static region(s), if any, to be output by the example static region identifier 435. In the illustrated example of FIG. 4, the static region verifier 440 obtains verification information (e.g., from the example motion estimator 125), and compares this information to the static blocks/regions to be output by the static region verifier 440. Depending on the results of verification, the static region verifier 440 can cause the static region information being output by the static region identifier 435 to remain unchanged, or can cause some of all of the information to change (e.g., thereby causing static region(s) to be identified as non-static and/or vice versa). For example, the static region verifier 440 can receive verification information in the form of motion data (e.g., motion vectors) from the example motion estimator 125. In such examples, the static region verifier 440 compares the motion data for a given pixel block with the filtered static map entry for the given pixel block. If the motion data indicates that the pixel block is associated with little to no motion (e.g., if the motion data has small magnitude(s)), and the static map entry identifies the pixel block as a static block, the identification of the pixel block as a static block remains unchanged. Similarly, if the motion data indicates that the pixel block is associated with motion (e.g., if the motion data has large magnitude(s)), and the static map entry identifies the pixel block as a non-static block, the identification of the pixel block as a non-static block remains unchanged. However, if the motion data and the static map entry are divergent (e.g., one indicates motion and the other indicates static, or vice versa), then the magnitude and/or reliability of the motion data input to the static region verifier 440 can be used to determine whether to change the static map entry for the given pixel block. For example, if the motion data strongly indicates a pixel block is associated with a region having little to no motion, but the static map entry for that pixel block identifies the pixel block as a non-static block, then the static region verifier 440 may revise the static map entry to identify the pixel block as a static block. Conversely, if the motion data strongly indicates a pixel block is associated with a region having motion, but the static map entry for that pixel block identifies the pixel block as a static block, then the static region verifier 440 may revise the static map entry to identify the pixel block as a non-static block.

Figure 8:
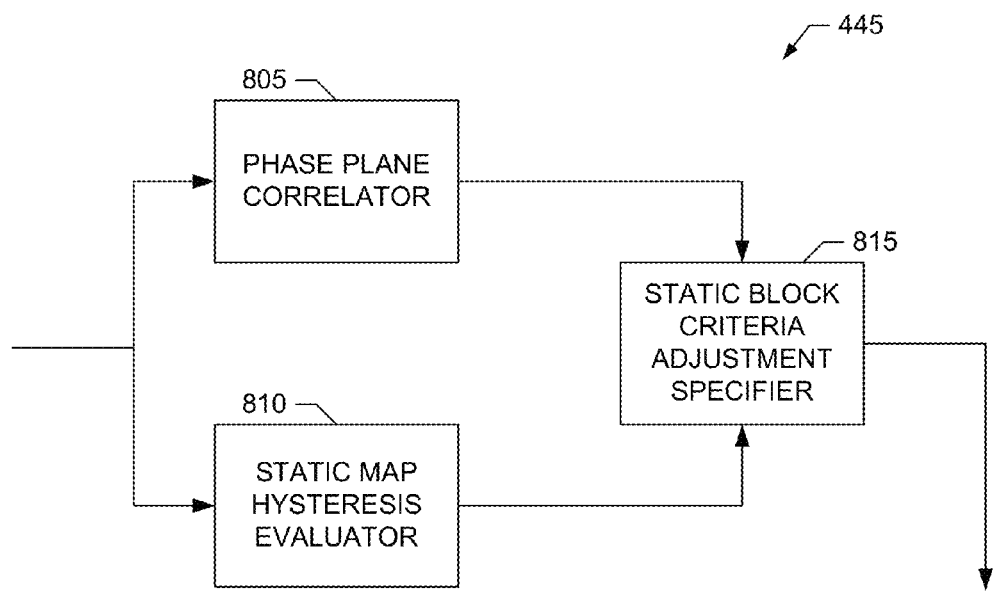
FIG. 8 is a block diagram of an example static block criteria adjuster that can be used to implement the example static region detector of FIG. 4.

In some examples, the static region detector 115 of FIG. 4 includes an example static block criteria adjuster 445 to adjust the static block detection criteria evaluated by the example static block criteria evaluator 410. For example, the static block criteria adjuster 445 of some examples examines the correlation between the input (e.g., current) video frame being processed and the preceding frame to determine whether regions of the input video frame correspond to regions of motion or no motion. If appropriate, the static block criteria adjuster 445 can then adjust one or more of the static block detection criteria accordingly. As another example, the static block criteria adjuster 445 of some examples examines prior static maps determined by the static region detector 115 and applies hysteresis or other feedback to determine whether to adjust one or more of the static block detection criteria and, if so, by how much. An example implementation of the static block criteria adjuster 445 of FIG. 4 is illustrated in FIG. 8, which is described in further detail below.

An example implementation of the static block criteria evaluator 410 of FIG. 4 is illustrated in FIG. 6. As mentioned above, the static block criteria evaluator 410 evaluates the pixel blocks in a current (e.g., first) video frame and the corresponding pixel blocks in a preceding (e.g., second) video frame of the input video sequence 105 against one or more static block detection criteria to identify zero or more static pixel blocks in the current (e.g., first) video frame. In some examples, the static block criteria evaluator 410 performs independent static block criteria evaluations for different video component planes of the current (e.g., first) video frame.

Turning to FIG. 6, the illustrated example static block criteria evaluator 410 includes an example per-block pixel comparator 605 to compare the pixels in a first pixel block of the current (e.g., first) video frame and a corresponding second pixel block of the preceding (e.g., second) video frame against a sum of absolute differences criterion to determine whether the first pixel block is a static block. The first pixel block of the current (e.g., first) video frame and the corresponding second pixel block of the preceding (e.g., second) video frame are both located at the same frame location and in the same video component plane and, thus, correspond with each other. In the illustrated example of FIG. 6, the per-block pixel comparator 605 computes a sum of the absolute differences between pixels in the first pixel block and corresponding pixels (e.g., at the same frame location) in the second pixel block. The per-block pixel comparator 605 then compares the sum of the absolute differences to a threshold. If the sum of the absolute differences satisfies (e.g., is smaller than) the threshold, the per-block pixel comparator 605 identifies the first pixel block of the current (e.g., first) video frame as a static block. Otherwise, the per-block pixel comparator 605 identifies the first pixel block of the current (e.g., first) video frame as a non-static block.

In some examples, the per-block pixel comparator 605 employs different thresholds for different video component planes. For example, the per-block pixel comparator 605 may employ a first threshold when evaluating the sum of the absolute differences for a pixel block in the luminance plane, and a different second threshold when evaluating the sum of the absolute differences for a pixel block in one of the chrominance planes. By way of example, for a 16×16 pixel block, which contains 256 total pixels, the per-block pixel comparator 605 may use a threshold of 3-per-pixel for the luminance plane, yielding a total threshold of 3×256=768 against which the sum of the absolute differences is to be compared. However, the per-block pixel comparator 605 may use a threshold of 4-per-pixel for each of the chrominance planes, yielding a total threshold of 4×256=1024 against which the sum of the absolute differences is to be compared. Different per-pixel values for calculating the thresholds for use in the luminance and/or chrominance planes, and/or different thresholds in their entirety, could alternatively be used.

The example static block criteria evaluator 410 of FIG. 6 also includes an example edge map creator 610 to create an edge map for the current input video frame. In some examples, the edge map creator 610 creates separate edge maps for the different video component planes of the current input video frame. The edge map creator 610 can use any type or combination of edge mapping techniques to identify edges in the current input video frame. For example, the edge map creator 610 of the illustrated example applies horizontal and vertical Sobel operators to the different video component planes (e.g., luminance and chrominance planes) of the current input video frame. The resulting edge map determined by the edge map creator 610 identifies whether each pixel in the current input video frame is part of a vertical edge, is part of a horizontal edge, is part of both a vertical edge and a horizontal edge, is not part of an edge, etc.

The example static block criteria evaluator 410 of FIG. 6 further includes one or both of an example per-block edge counter 615 and an example per-block edge correspondence evaluator 620 to use the edge map(s) created by the edge map creator 610 to determine whether a given pixel block of the current input video frame is a static block. For example, the per-block edge counter 615 compares the pixels in the given pixel block of the current input video frame (e.g., for a given video component plane) against an edge count criterion to determine whether there is a sufficient number of edge pixels in the given pixel block to make an accurate static block determination. For example, the per-block edge counter 615 can use the edge map created by the edge map creator 610 for a given video component plane to determine which pixels in the given pixel block for the given video component plane are associated with edges and, thus, considered to be edge pixels. The per-block edge counter 615 of the illustrated example then counts the number of edge pixels in the given pixel block and compares the number to a threshold. If the number of edge pixels satisfies (e.g., is greater than or equal to) the threshold, the per-block edge counter 615 indicates that a static block determination can be made for the given pixel block for the given video component plane.

However, if the number of edge pixels does not satisfy (e.g., is less than) the threshold, the per-block edge counter 615 indicates that a static block determination cannot be made for the given pixel block for the given video component plane. For example, a pixel block containing motion blur due to large motion, and/or containing noise (e.g., resulting from light source changes, camera/sensor imperfections, etc.) may have few edges and, thus, static detection performed on that pixel block may be unreliable. In some examples, the threshold used for evaluating the number of edge pixels is determined by dividing the number of pixels in a pixel block by a factor. By way of example, for a 16×16 pixel block, which contains 256 total pixels, the per-block edge counter 615 may use a factor of 4 to yield a threshold of 256/4=64 against which the number of edge pixels in a pixel block is to be compared. Different factors and/or techniques for determining the threshold could alternatively be used.

In the illustrated example of FIG. 6, the per-block edge correspondence evaluator 620 compares the edge pixels in a first pixel block of the current (e.g., first) video frame and the corresponding pixels in a second pixel block of the preceding (e.g., second) video frame against an edge correspondence criterion to determine whether the first pixel block is a static block. For example, the per-block edge correspondence evaluator 620 can use the edge map created by the edge map creator 610 for a given video component plane to determine which pixels in the first pixel block of the current (e.g., first) video frame (and for the given video component plane) are associated with edges and, thus, considered to be edge pixels. The per-block edge correspondence evaluator 620 can also use the edge map to identify the edge orientation associated with each edge pixel in the first pixel block (e.g., horizontal, vertical, both horizontal and vertical, none, etc.). The per-block edge correspondence evaluator 620 of the illustrated example then compares the edge pixels identified in the first pixel block of the current (e.g., first) video frame (and for the given video component plane) against the corresponding pixels at the same locations in the preceding (e.g., second) video frame (and for the given video component plane) to determine the number of pixel pairs that are not in edge correspondence (e.g., that are not both edges or that are both edges but have different orientations).

The example per-block edge correspondence evaluator 620 of FIG. 6 further compares the number of divergent pixel pairs (or, in other words, the number of pixel pairs not in correspondence) with a threshold. If the number of divergent pixel pairs for the first pixel block of the current (e.g., first) video frame (and for the given video component plane) satisfies (e.g., is less than or equal to) the threshold, the number of divergent edge pairs is small and, thus, the per-block edge correspondence evaluator 620 identifies the first pixel block of the current (e.g., first) video frame (and for the given video component plane) as a static block. Otherwise, if the number of divergent edge pairs does not satisfy (e.g., is greater than) the threshold, the per-block edge correspondence evaluator 620 identifies the first pixel block of the current (e.g., first) video frame (and for the given video component plane) as a non-static block.

In some examples, the threshold used for evaluating the number of divergent edge pairs is determined by dividing the number of edge pixels in a pixel block by a factor. By way of example, the per-block edge correspondence evaluator 620 may use a factor of 32 to divide the number of edge pixels in a pixel block to determine the threshold for evaluating the number of divergent edge pairs. As such, the threshold varies in accordance with the number of edge pixels in the pixel block being examined. For a 16×6 pixel block having 256 total pixels, the upper limit on such a threshold would be 256/36=8. Thus, in such an example, if more than 8 edge pairs in the current and preceding pixel block do not have correspondence, then the current pixel block is identified as non-static. Different factors and/or techniques for determining the threshold could alternatively be used.

In the illustrated example of FIG. 6, the static block criteria evaluator 410 includes an example evaluation combiner 625 to combine the results of evaluating the static block detection criteria (e.g., which corresponds to combining the static block detection results obtained by one or more, or all of, the example per-block pixel comparator 605, the example per-block edge counter 615 and/or the example per-block edge correspondence evaluator 620 in the illustrated example, but could correspond to combining other groups of criteria in other examples). In some examples, the evaluation combiner 625 determines that a given pixel block in a given video component plane of a given input frame is a static block if all of the evaluated static block criteria indicate that the given pixel block is a static block. Otherwise, if any of the evaluated static block criteria indicate that the given pixel block is not a static block, the evaluation combiner 625 determines that the given pixel block is a non-static block. In other examples, the evaluation combiner 625 determines that a given pixel block in a given video component plane of a given input frame is a static block if a majority of the evaluated static block criteria indicate that the given pixel block is a static block. Otherwise, if the majority of the evaluated static block criteria indicate that the given pixel block is a not a static block, the evaluation combiner 625 determines that the given pixel block is a non-static block. In still other examples, the evaluation combiner 625 determines that a given pixel block in a given video component plane of a given input frame is a static block if any of the evaluated static block criteria indicate that the given pixel block is a static block. Otherwise, if all of the evaluated static block criteria indicate that the given pixel block is not a static block, the evaluation combiner 625 determines that the given pixel block is a non-static block.

Figure 7B:
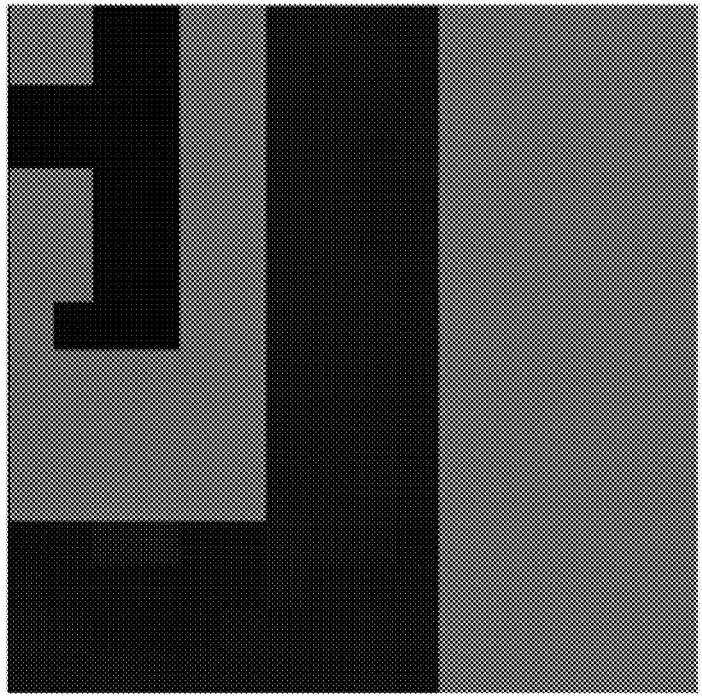
FIGS. 7A-B illustrate an example operation of the example static block criteria evaluator of FIG. 6.
Figure 7A:
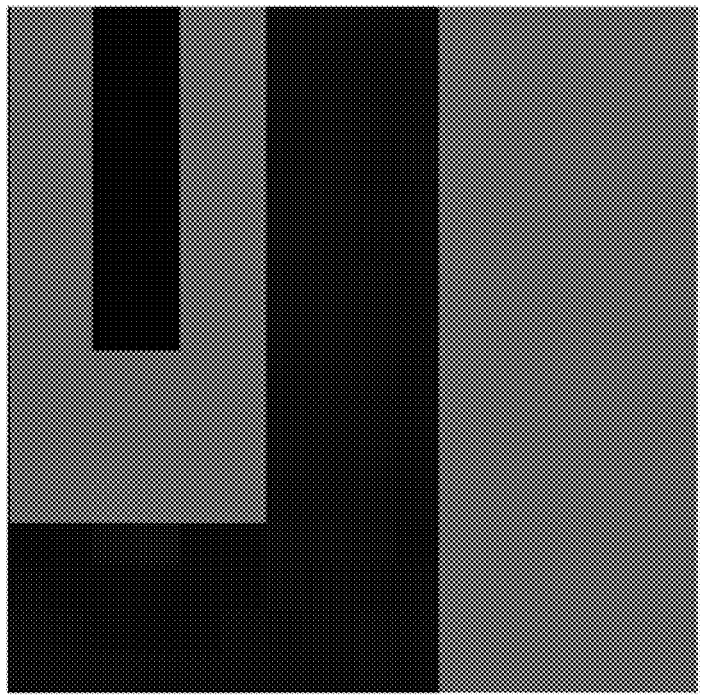

FIGS. 7A-B illustrate example operations of the example static block criteria evaluator 410 of FIG. 6. FIG. 7A depicts a first pixel block of a current (e.g., first) video frame and FIG. 7B depicts the corresponding second pixel block of the preceding (e.g., second) video frame. In the illustrated example of FIGS. 7A-B, the lighter shaded pixels correspond to edge pixels identified by the example edge map creator 610. In an example operation, the per-block edge counter 615 counts the number of edges (e.g., lightly shaded) pixels in the first pixel block depicted in FIG. 7A and determines that the number of edge pixels meets the threshold for performing static block determination. In a further example operation, the example per-block edge correspondence evaluator 620 determines that the number of divergent pixel pairs between the first pixel block depicted in FIG. 7A and the second pixel block depicted in FIG. 7B satisfies the threshold used for evaluating the number of divergent edge pairs. Accordingly, in such an example, the per-block edge correspondence evaluator 620 determines that the first pixel block depicted in FIG. 7A is a static block.

An example implementation of the static block criteria adjuster 445 of FIG. 4 is illustrated in FIG. 8. As mentioned above, the static block criteria adjuster 445 can adjust the static block detection criteria evaluated by the example static block criteria evaluator 410. In some examples, the static block criteria adjuster 445 causes different adjustments to the static block detection criteria to be applied when evaluating different pixel blocks of the current (e.g., first) video frame being processed. In other examples, the static block criteria adjuster 445 causes the same adjustment(s) to be applied for evaluating all pixel blocks of the current (e.g., first) video frame being processed.

Turning to FIG. 8, the example static block criteria adjuster 445 illustrated therein includes an example phase plane correlator 805 to examine the correlation between the input (e.g., current) video frame being processed and the preceding frame to determine whether regions of the input video frame correspond to regions of motion or no motion. In the illustrated example, the phase plane correlator 805 divides the input (e.g., current) and preceding video frame pair for a given video component plane (also referred to as the given phase plane) into regions (e.g., such as regions of 512×256 pixels or some other pixel size). Then, for each region, the phase plane correlator 805 calculates the phase plane correlation between the input (e.g., current) video frame and the preceding frame in the given region. If the first (e.g., strongest) correlation peak for the given region is at the position corresponding to zero motion, then the phase plane correlator 805 of the illustrated example indicates that one or more of the static block detection criteria should be adjusted in favor of declaring pixel blocks in the given region to be static blocks. If the second (e.g., next strongest) correlation peak for the given region is at the position corresponding to zero motion, then the phase plane correlator 805 of the illustrated example leaves the static block detection criteria unchanged for evaluating the pixel blocks in the given region. If neither of the first two correlation peaks (e.g., the strongest and next strongest peaks) for the given region are at the position corresponding to zero motion, then the phase plane correlator 805 of the illustrated example indicates that one or more of the static block detection criteria should be adjusted in favor of declaring the pixel blocks in the given region to be non-static blocks.

In some examples, the example static block criteria adjuster 445 of FIG. 8 also includes an example static map hysteresis evaluator 810, which can examine prior static maps determined by the static region detector 115 and apply hysteresis or other feedback to adjust, if at all, one or more of the static block detection criteria. For example, the static map hysteresis evaluator 810 can examine the entry for a given pixel block location and/or the entry or entries for its neighboring block locations in a prior static map determined by the static region detector 115. If the prior static map entry or entries for the given pixel block location and/or its neighboring block locations indicate that these location(s) were identified to be static blocks in the prior static map (e.g., which corresponds to the preceding video frame), then there is a strong likelihood/probability that the given pixel block in the current video frame being processed will still be a static block. Accordingly, in such a case, the static map hysteresis evaluator 810 indicates that one or more of the static block detection criteria should be adjusted in favor of declaring the given pixel block in the current frame to be a static block. However, if, for a given pixel block in the current video frame, the given pixel block location and/or its neighboring block locations were identified to be non-static blocks in the prior static map (e.g., which corresponds to the preceding video frame), then there is a strong likelihood/probability that the given pixel block in the current video frame being processed will still be a non-static block. Accordingly, in such a case, the static map hysteresis evaluator 810 indicates that one or more of the static block detection criteria should be adjusted in favor of declaring the given pixel block in the current frame to be a non-static block.

The example static block criteria adjuster 445 of FIG. 8 further includes an example static block criteria adjustment specifier 815 to specify the adjustment(s), if any, to be made to one or more of the static block detection criteria based on the results from the phase plane correlator 805 and/or the static map hysteresis evaluator 810. In some examples, to adjust a particular static block detection criterion in favor of declaring the pixel blocks in the given region to be static blocks, the static block criteria adjustment specifier 815 adjusts the threshold of the particular static block detection criterion by some percentage value in a first direction. Conversely, in some examples, to adjust a particular static block detection criterion in favor of declaring the pixel blocks in the given region to be non-static blocks, the static block criteria adjustment specifier 815 adjusts the threshold of the particular static block detection criterion by the same or a different percentage value in an opposite second direction. For example, the static block criteria adjustment specifier 815 can, in some examples, adjust (e.g., increase) the threshold used by the per-block pixel comparator 605 of FIG. 6 by some percentage (e.g., 10%, 25%, etc.) to bias the per-block pixel comparator 605 towards identifying pixel blocks in a given region as static blocks, and can adjust (e.g., decrease) the threshold by some percentage (e.g., 10%, 25%, etc.) to bias the per-block pixel comparator 605 towards identifying pixel blocks in the given region as non-static blocks. Additionally or alternatively, in some examples, the static block criteria adjustment specifier 815 can adjust (e.g., increase) the threshold used by the per-block edge correspondence evaluator 620 of FIG. 6 by some percentage (e.g., 10%, 25%, etc.) to bias the per-block edge correspondence evaluator 620 towards identifying pixel blocks in a given region as static blocks, and can adjust (e.g., decrease) the threshold by some percentage (e.g., 10%, 25%, etc.) to bias the per-block edge correspondence evaluator 620 towards identifying pixel blocks in the given region as non-static blocks.

An example implementation of the static map combiner 425 of FIG. 4 is illustrated in FIG. 9. As mentioned above, the static map combiner 425 combines the different static maps for a given (e.g., current) input video frame into an overall static map identifying the zero or more static pixel blocks in the given (e.g., current) input video frame. In the illustrated example of FIG. 9, the static map combiner 425 includes an example intra-component static map combiner 905 to combine multiple static maps that are associated with the same video component plane of the input (e.g., current) video frame being processed. For example, for a given video component plane (e.g., the luminance plane, one of the chrominance planes, etc.), the example video segmenter 405 may perform multiple segmentation iterations of the current video frame being processed, with the pixel blocks obtained from a first segmentation iteration partially overlapping the pixel blocks obtained from a second segmentation iteration. The static block criteria evaluator 410 can then compare, for the given video component plane, the pixel blocks obtained for the current video frame from the first segmentation iteration with corresponding pixel blocks obtained from a corresponding first segmentation iteration of the preceding video frame to determine the static block(s) corresponding to the first segmentation iteration of the current video frame. Similarly, the static block criteria evaluator 410 can compare, for the given video component plane, the pixel blocks obtained from the second segmentation iteration of the current video frame with corresponding pixel blocks obtained from a corresponding second segmentation iteration of the preceding video frame to determine the static block(s) corresponding to the second segmentation iteration of the current video frame. The static map creator 415 can then create separate static maps for each segmentation iteration, which respectively identify the static blocks detected in each segmentation iteration of the current video frame.

In some such examples, the intra-component static map combiner 905 combines the different static maps corresponding to the different segmentation iterations to form a composite static map for the given video component plane. In some examples, each entry in the composite static map for a given video component plane corresponds to a pixel sub-block in the given video component plane. A pixel sub-block corresponds to the overlapped pixel block region that is included in the pixel blocks of different segmentation iterations. For example, the sub-block 560 of FIG. 5 corresponds to the overlapped pixel block region that is included in pixel blocks 510, 525, 535 and 550 of segmentation iterations 505, 520, 530 and 545, respectively. Accordingly, the resolution of the composite static map will be finer (e.g., higher resolution) than the individual static maps because the sub-blocks in the composite static map will be smaller than the pixel blocks in the individual static maps corresponding to the different segmentation iterations.

In some examples, the intra-component static map combiner 905 determines the value of an entry for a given sub-block based on the values of some or all of the pixel blocks, across the different segmentation iterations, which contain the given sub-block. For example, the intra-component static map combiner 905 can be configured to set the value of the composite pixel map entry for the given sub-block to be a value (e.g., a logic "1") identifying the sub-block to be a static block if all pixel blocks (across the different segmentation iterations) containing the sub-block have respective static map entries identifying the blocks as static blocks. Otherwise, if any of the pixel blocks containing the sub-block have a respective map value identifying the block as a non-static block, the intra-component static map combiner 905 sets the value of the composite pixel map entry for the given sub-block to be a value (e.g., a logic "0") identifying the sub-block to be a non-static block. In other examples, the intra-component static map combiner 905 sets the value of the composite pixel map entry for the given sub-block to be a value corresponding to a majority vote of the respective static map entries for the pixel blocks (across the different segmentation iterations) containing the sub-block. In such examples, if the majority of the pixel blocks (across the different segmentation iterations) containing the given sub-block are identified as static blocks, the given pixel sub-block is also identified as a static block. Otherwise, if the majority of the pixel blocks (across the different segmentation iterations) containing the given sub-block are identified as non-static blocks, the given pixel sub-block is also identified as a non-static block.

The example static map combiner 425 also includes an example inter-component static map combiner 910 to combine multiple static maps that are associated with different video component planes of the input (e.g., current) video frame being processed. For example, and as described above, the static map creator 415 of the illustrated example creates different static maps for the different video component planes (e.g., one luminance plane and two chrominance planes) of a current video frame being processed, with each static map identifying the static blocks in the respective video component plane of the current video frame being processed. In such examples, the inter-component static map combiner 910 obtains the different static maps (e.g., which may be composite maps if the example intra-component static map combiner 905 is present) determined for the different video component planes of the current video frame being processed and combines the individual static maps for the different video component planes into an overall static map for the current video frame.

In some examples, the inter-component static map combiner 910 is configured to set the value of the overall pixel map entry for the given pixel block to be a value (e.g., a logic "1") identifying the given pixel block to be a static block if the pixel blocks for the different video component planes, which correspond to the given pixel block, all have respective static map entries identifying the blocks as static blocks. Otherwise, if any of the pixel blocks, in the different video component planes, corresponding to the given pixel block of interest have a respective map value identifying the block as a non-static block, the inter-component static map combiner 910 of such examples sets the value of the overall pixel map entry for the given pixel block to be a value (e.g., a logic "0") identifying the pixel block to be a non-static block. In other examples, the inter-component static map combiner 910 sets the value of the overall pixel map entry for the given pixel block of interest to be a value corresponding to a majority vote of the respective static map entries for pixel blocks, from the different video component planes, corresponding to the given pixel block of interest. In such examples, the given pixel block of interest is identified as a static block if the majority of the pixel blocks, from the different video component planes, corresponding to the given pixel block are identified as static blocks. Otherwise, the given pixel block of interest is identified as a non-static block if the majority of the pixel blocks, from the different video component planes, corresponding to the given pixel block are identified as non-static blocks.

Figure 10:
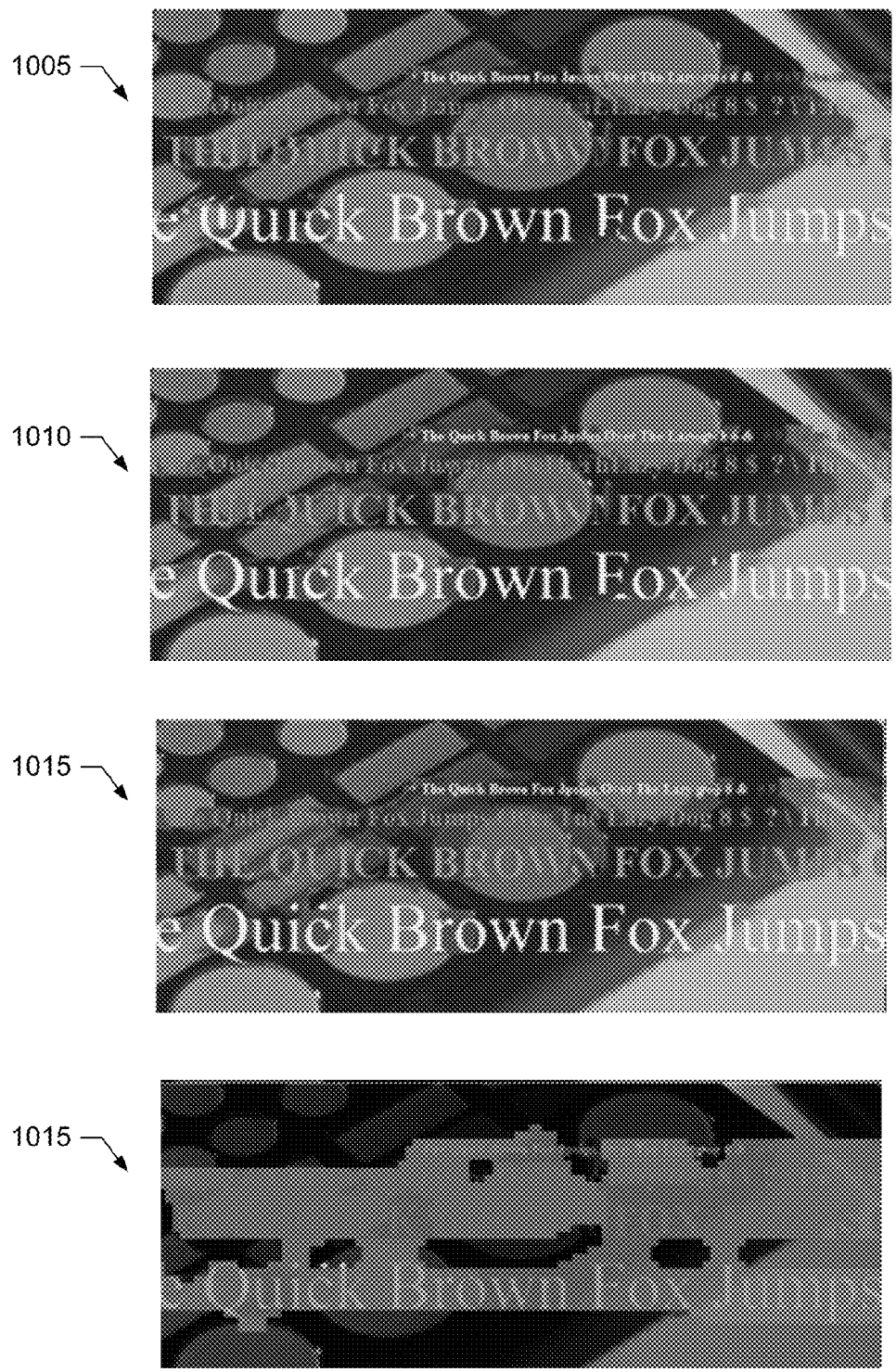
FIG. 10 illustrates example operating results that may be achieved by the example video processing system of FIG. 1.

FIG. 10 illustrates example operating results that may be achieved by the example video processing system 100 employing the example static region detector 115 of FIG. 1. In particular, FIG. 10 illustrates example frame interpolation results that may be achieved when performing frame-rate upconversion using block-based static region detection as implemented by the static region detector 115 of FIG. 1. FIG. 10 depicts an example frame 1005 corresponding to an example interpolated frame determined by the frame rate upconverter 120 without using any static region information provided by the static region detector 115. An example frame 1010 depicted in FIG. 10 corresponds to an example interpolated frame determined by the frame rate upconverter 120 with static region information determined by the static region detector 115 under a first example configuration. In the first example configuration, the static block criteria evaluator 410 of the static region detector 115 includes the per-block pixel comparator 605 and the per-block edge counter 615, but not the per-block edge correspondence evaluator 620. Also, in the first example configuration, the static region detector 115 does not include the static block criteria adjuster 445.

An example frame 1015 depicted in FIG. 10 corresponds to an example interpolated frame determined by the frame rate upconverter 120 with static region information determined by the static region detector 115 under a second example configuration. In the second example configuration, the static block criteria evaluator 410 of the static region detector 115 includes the per-block pixel comparator 605, the per-block edge counter 615, and not the per-block edge correspondence evaluator 620. Also, in the second example configuration, the static region detector 115 includes the static block criteria adjuster 445. The lightly shaded regions in the example frame 1020 of FIG. 10 correspond to the static regions identified by the static region detector 115 under the second example configuration.

While an example manners of implementing the example video processing system 100 and, more specifically, the example static region detector 115 are illustrated in FIGS. 1-10, one or more of the elements, processes and/or devices illustrated in FIGS. 1-10 may be combined, divided, re-arranged, omitted, eliminated and/or implemented in any other way. Further, the example frame rate upconverter 120, the example motion estimator 125, the example video segmenter 405, the example static block criteria evaluator 410, the example static map creator 415, the example static map storage 420, the example static map combiner 425, the example media filter 430, the example static region identifier 435, the example static region verifier 440, the example static block criteria adjuster 445, the example per-block pixel comparator 605, the example edge map creator 610, the example per-block edge counter 615, the example per-block edge correspondence evaluator 620, the example evaluation combiner 625, the example phase plane correlator 805, the example static map hysteresis evaluator 810, the example static block criteria adjustment specifier 815, the example intra-component static map combiner 905, the example inter-component static map combiner 910 and/or, more generally, the example static region detector 115 and/or the example video processing system 100 of FIGS. 1-10 may be implemented by hardware, software, firmware and/or any combination of hardware, software and/or firmware. Thus, for example, any of the example frame rate upconverter 120, the example motion estimator 125, the example video segmenter 405, the example static block criteria evaluator 410, the example static map creator 415, the example static map storage 420, the example static map combiner 425, the example media filter 430, the example static region identifier 435, the example static region verifier 440, the example static block criteria adjuster 445, the example per-block pixel comparator 605, the example edge map creator 610, the example per-block edge counter 615, the example per-block edge correspondence evaluator 620, the example evaluation combiner 625, the example phase plane correlator 805, the example static map hysteresis evaluator 810, the example static block criteria adjustment specifier 815, the example intra-component static map combiner 905, the example inter-component static map combiner 910 and/or, more generally, the example static region detector 115 and/or the example video processing system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example video processing system 100, the example static region detector 115, the example frame rate upconverter 120, the example motion estimator 125, the example video segmenter 405, the example static block criteria evaluator 410, the example static map creator 415, the example static map storage 420, the example static map combiner 425, the example media filter 430, the example static region identifier 435, the example static region verifier 440, the example static block criteria adjuster 445, the example per-block pixel comparator 605, the example edge map creator 610, the example per-block edge counter 615, the example per-block edge correspondence evaluator 620, the example evaluation combiner 625, the example phase plane correlator 805, the example static map hysteresis evaluator 810, the example static block criteria adjustment specifier 815, the example intra-component static map combiner 905 and/or the example inter-component static map combiner 910 is/are hereby expressly defined to include a tangible computer readable storage device or storage disk such as a memory, a digital versatile disk (DVD), a compact disk (CD), a Blu-ray disk, etc. storing the software and/or firmware. Further still, the example video processing system 100 and/or the example static region detector 115 of FIGS. 1-10 may include one or more elements, processes and/or devices in addition to, or instead of, those illustrated in FIGS. 1-10, and/or may include more than one of any or all of the illustrated elements, processes and devices.

Flowcharts representative of example machine readable instructions for implementing the example video processing system 100, the example static region detector 115, the example frame rate upconverter 120, the example motion estimator 125, the example video segmenter 405, the example static block criteria evaluator 410, the example static map creator 415, the example static map storage 420, the example static map combiner 425, the example media filter 430, the example static region identifier 435, the example static region verifier 440, the example static block criteria adjuster 445, the example per-block pixel comparator 605, the example edge map creator 610, the example per-block edge counter 615, the example per-block edge correspondence evaluator 620, the example evaluation combiner 625, the example phase plane correlator 805, the example static map hysteresis evaluator 810, the example static block criteria adjustment specifier 815, the example intra-component static map combiner 905 and/or the example inter-component static map combiner 910 are shown in FIGS. 11-14. In these examples, the machine readable instructions comprise one or more programs for execution by a processor, such as the processor 1512 shown in the example processor platform 1500 discussed below in connection with FIG. 15. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processor 1512, but the entire program or programs and/or portions thereof could alternatively be executed by a device other than the processor 1512 and/or embodied in firmware or dedicated hardware (e.g., implemented by an ASIC, a PLD, an FPLD, discrete logic, etc.). Also, one or more of the machine readable instructions represented by the flowcharts of FIGS. 11-14 may be implemented manually. Further, although the example program(s) is(are) described with reference to the flowcharts illustrated in FIGS. 11-14, many other methods of implementing the example video processing system 100, the example static region detector 115, the example frame rate upconverter 120, the example motion estimator 125, the example video segmenter 405, the example static block criteria evaluator 410, the example static map creator 415, the example static map storage 420, the example static map combiner 425, the example media filter 430, the example static region identifier 435, the example static region verifier 440, the example static block criteria adjuster 445, the example per-block pixel comparator 605, the example edge map creator 610, the example per-block edge counter 615, the example per-block edge correspondence evaluator 620, the example evaluation combiner 625, the example phase plane correlator 805, the example static map hysteresis evaluator 810, the example static block criteria adjustment specifier 815, the example intra-component static map combiner 905 and/or the example inter-component static map combiner 910 may alternatively be used. For example, with reference to the flowcharts illustrated in FIGS. 11-14, the order of execution of the blocks may be changed, and/or some of the blocks described may be changed, eliminated, combined and/or subdivided into multiple blocks.

As mentioned above, the example processes of FIGS. 11-14 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 11-14 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

Figure 11:
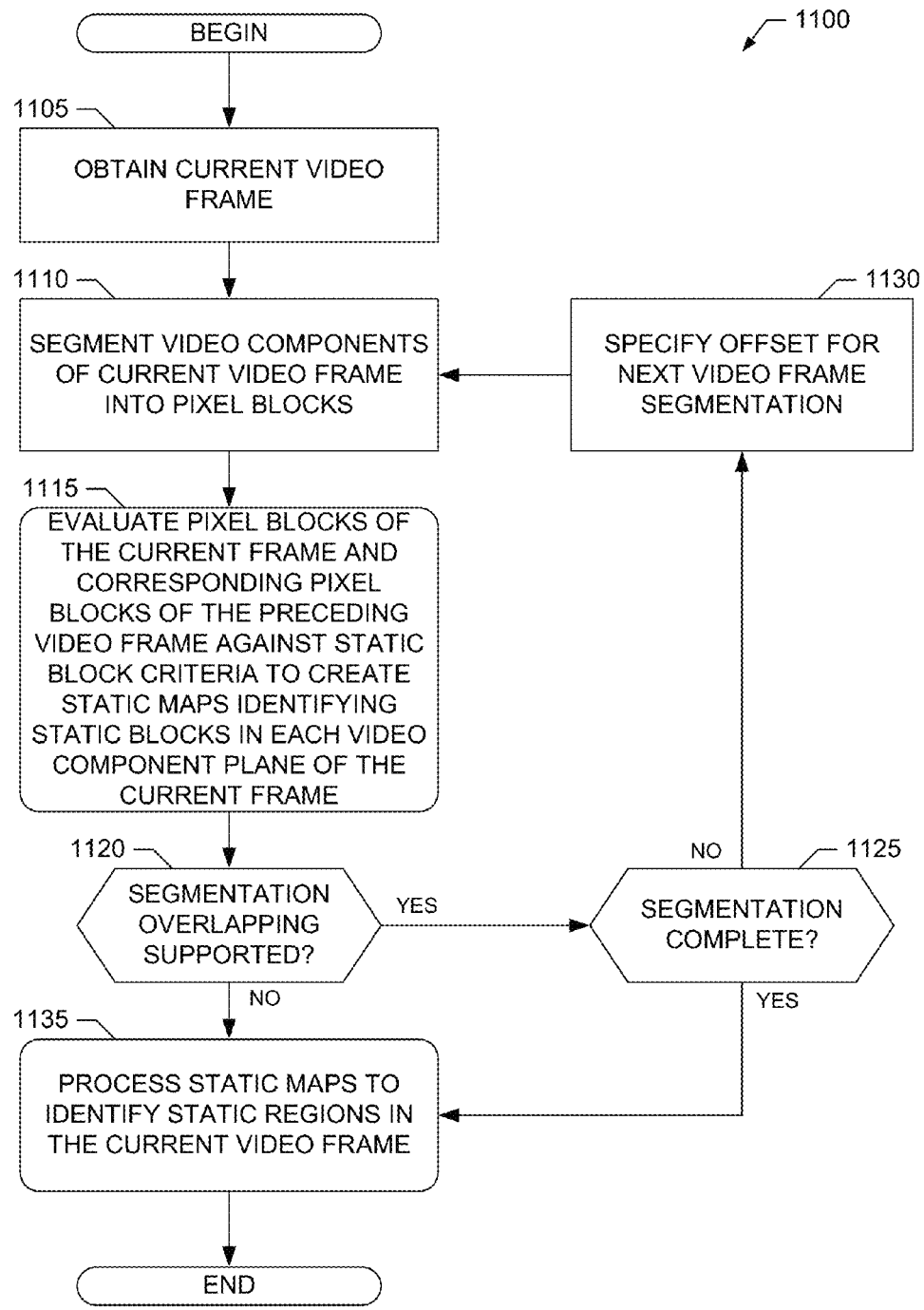
FIG. 11 is a flowchart representative of example machine readable instructions that may be executed to implement the example static region detector of FIGS. 1 and/or 4.

An example program 1100 that may be executed to implement the example static region detector 115 of FIGS. 1 and/or 4 is represented by the flowchart shown in FIG. 11. The example program 1100 may be executed by the static region detector 115 to perform block-based static region detection as disclosed herein. With reference to the preceding figures and associated written descriptions, the example program 1100 of FIG. 11 begins execution at block 1105 at which the static region detector 115 obtains a current video frame of the input video sequence 105 for processing, as described above. At block 1110, the example video segmenter 405 of the static region detector 115 segments the different video component planes (e.g., the luminance plane and the two chrominance planes) of the current video frame into pixel blocks, as described above.

At block 1115, the static region detector 115 evaluates, for each video component plane, the pixel blocks obtained at block 1100 for the current video frame and corresponding pixel blocks for a preceding video frame against one or more static block detection criteria to identify the static block(s), if any, in each video component plane of the current frame, as described above. As further described above, at block 1115 the static region detector 115 uses these evaluation results to determine static maps for the different video component planes of the current video frame. The static map for a given video component plane includes entries for each pixel block in the given video component plane of the current video frame, and the entry for a particular pixel blocks identifies the pixel block as either a static block or a non-static block. An example program that may implement the processing at block 1115 is illustrated in FIG. 12, which is described in further detail below.

At block 1120, the static region detector 115 determines whether multiple segmentation iterations, with overlapping, of the current video frame, as described above, is supported. If multiple segmentation iterations, with overlapping, are supported (block 1120), then at block 1125 the static region detector 115 determines whether all iterations of segmenting the current video frame are complete. If segmentation of the current video frame is not complete (block 1125), then at block 1130 the video segmenter 405 of the static region detector 115 is configured with the segmentation offset to be used for the next segmentation iteration. Processing then returns to blocks 1110 and the blocks subsequent thereto at which the current video frame is segmented based on the configured offset, and static block(s), if any, are detected in the resulting pixel blocks, as described above.

Figure 13:
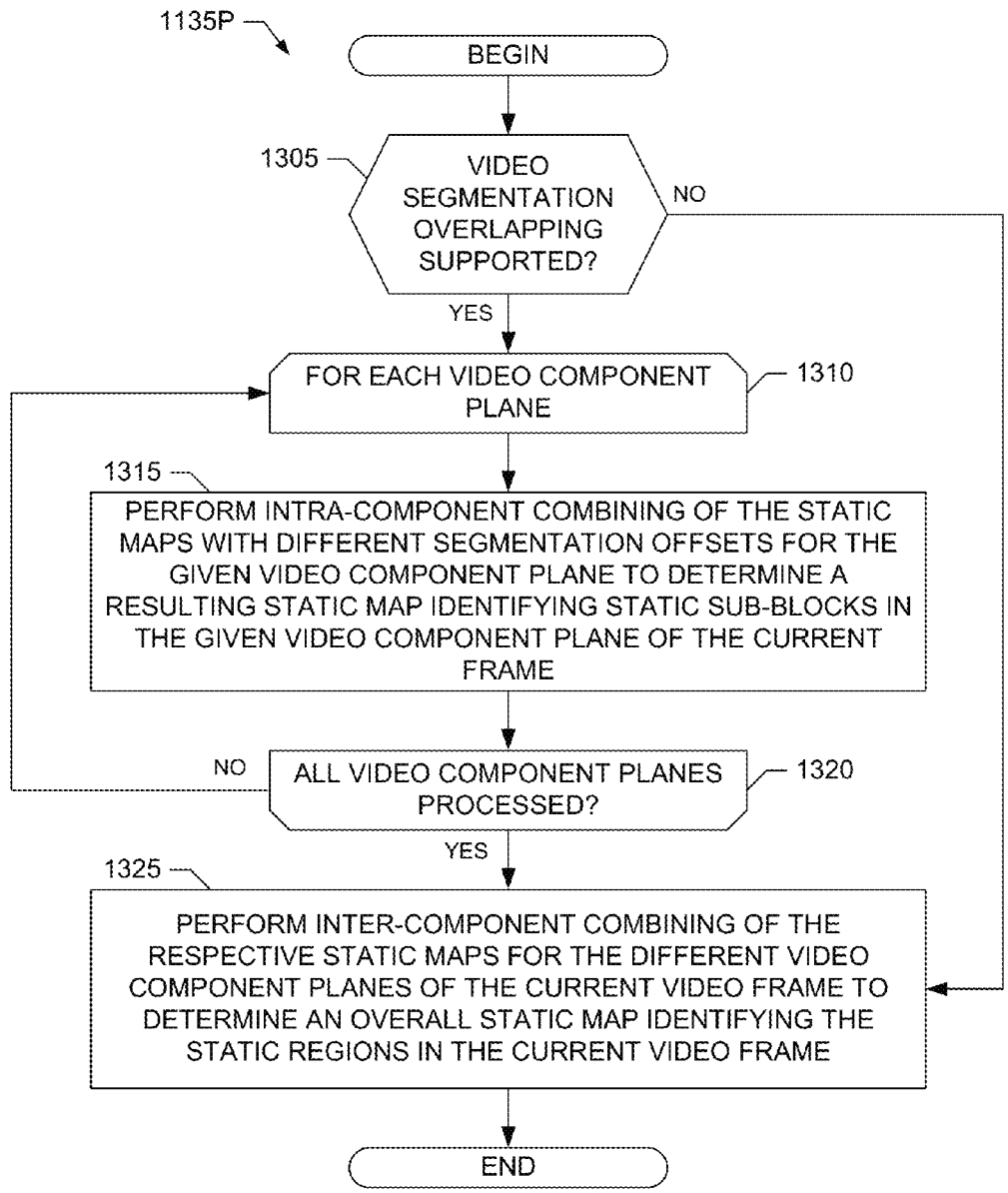
FIG. 13 is a flowchart representative of example machine readable instructions that may be executed to implement the example static map combiner of FIG. 9, and/or static map combining in the example static region detector of FIGS. 1 and/or 4.

At block 1135, the example static map combiner 425 of the static region detector 115 combines the individual static maps determined for the current video frame over the multiple video component planes and/or over multiple different segmentation offsets to determine an overall static map identifying the static block(s), if any, in the current video frame, as described above. An example program that may implement the processing at block 1135 is illustrated in FIG. 13, which is described in further detail below. The overall static map determined at block 1135 can then be further processed by the static region detector 115 to identify the static region(s), if any, of the current video frame, as described above.

Figure 12:
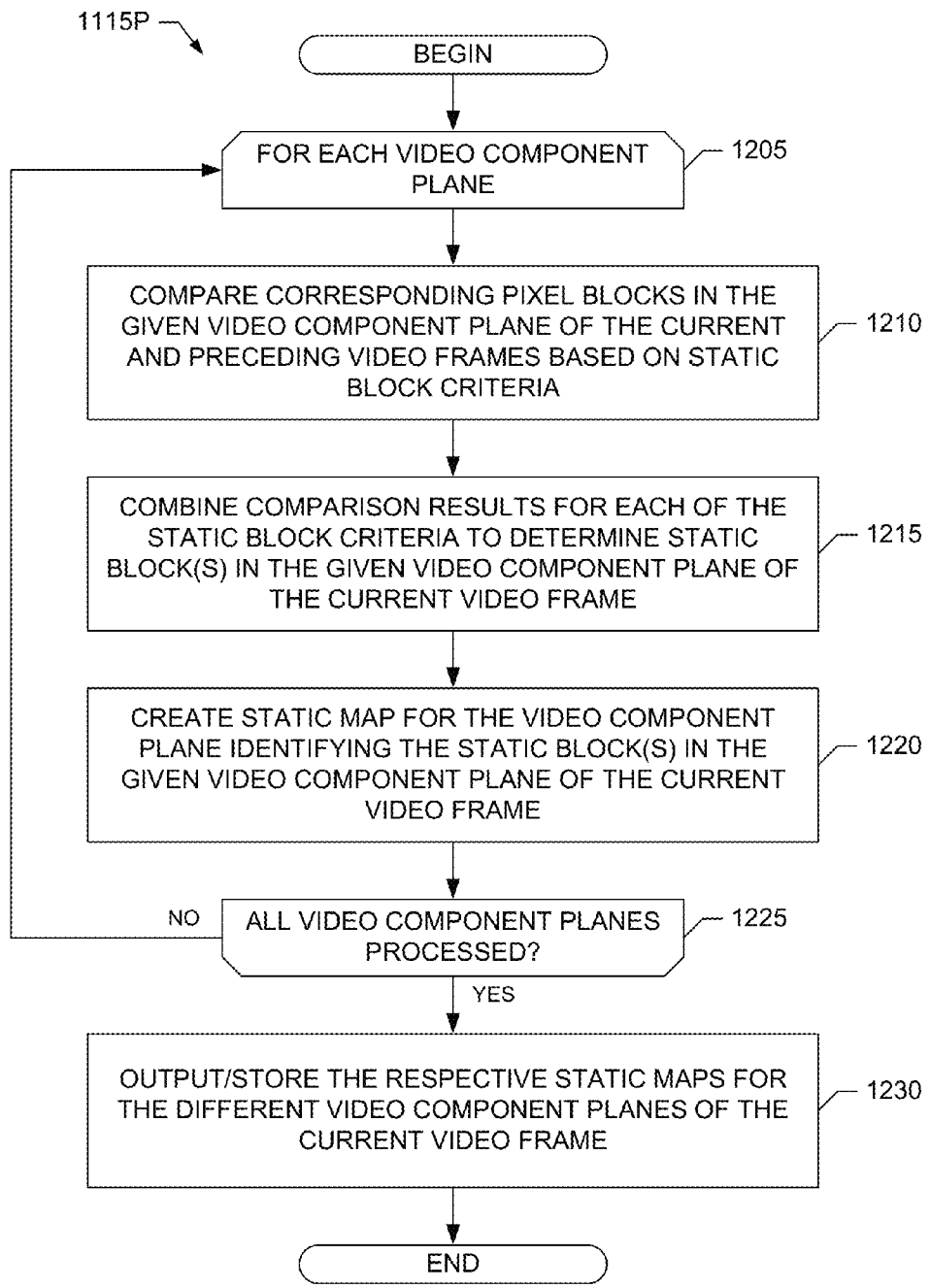
FIG. 12 is a flowchart representative of example machine readable instructions that may be executed to implement the example static block criteria evaluator of FIG. 6, and/or static block criteria evaluation and static map creation in the example static region detector of FIGS. 1 and/or 4.

An example program 1115P that may be executed to implement the example static block criteria evaluator 410 of FIGS. 4 and/or 6, and/or the example static map creator 415 of FIG. 4, and/or that may be used to implement the processing at block 1115 of FIG. 11, is represented by the flowchart shown in FIG. 12. With reference to the preceding figures and associated written descriptions, the example program 1115P of FIG. 12 begins execution at block 1205 at which the static block criteria evaluator 410 and the static map creator 415 of the static region detector 115 are configured to perform static block detection for a given video component plane (e.g., the luminance plane or one of the chrominance planes) of the current video frame being processed. At block 1210, the static block criteria evaluator 410 compares, based on static block detection criteria, corresponding pixel blocks in the given video component plane of the current video frame and the preceding video frame to identify the static block(s), if any, in the current video frame. For example, the static block criteria evaluator 410 can use one, some or all of the example per-block pixel comparator 605, the example per-block edge counter 615 and/or the example per-block edge correspondence evaluator 620, which are described above, to evaluate the static block detection criteria at block 1210.

At block 1215, the example evaluation combiner 625 of the static block criteria evaluator 410 combines, as described above, the results of evaluating the static block detection criteria at block 1210 to determine the static block(s), if any, in the given component plane of the current video frame. At block 1220, the static map creator 415 creates a static map for the given video component plane of the current video frame. As described above, the static map includes respective entries for each pixel block in the given video component plane of the current video frame, and the values of the static map are set to indicate which pixel blocks, if any, are static blocks and which pixel blocks, if any, are non-static blocks. At block 1225, the static region detector 115 causes processing to continue until all video component planes of the current video frame have been processed. At block 1230, the static map creator 415 outputs and/or stores the respective static maps determined for the different video component planes of the current video frame.

An example program 1135P that may be executed to implement the example static map combiner 425 of FIGS. 4 and/or 9, and/or that may be used to implement the processing at block 1135 of FIG. 11, is represented by the flowchart shown in FIG. 13. With reference to the preceding figures and associated written descriptions, the example program 1135P of FIG. 13 begins execution at block 1305 at which the static map combiner 425 of the static region detector 115 determines whether multiple segmentation iterations, with overlapping, of the current video frame, as described above, are supported. If multiple segmentation iterations, with overlapping, are supported (block 1305), then at block 1310, the example intra-component static map combiner 905 of the static map combiner 425 is configured to perform intra-component static map combining for a given video component plane (e.g., the luminance plane or one of the chrominance planes) of the current video frame being processed. At block 1315, the intra-component static map combiner 905 performs intra-component static map combining of different static maps determined for the given video component plane of the current video frame. As described above, the different static maps correspond to different segmentations of the given video component plane of the current video with different segmentation offsets, and each static map identifies the static block(s), if any, identified for a particular segmentation offset. At block 1315, the result of the intra-component static map combining is a single composite static map identifying the static block(s), if any, in the given video component plane of the current video frame being processed.

At block 1320, the example intra-component static map combiner 905 causes processing to continue until intra-component static map combining for all video component planes of the current video frame is complete. At block 1325, the example inter-component static map combiner 910 of the static map combiner 425 performs inter-component static map combining of the different static maps, which may or may not be composite static maps, for the different video component planes of the current video frame to determine an overall static map for the current video frame, as described above. The overall static map identifies the static block(s), if any, in the current video frame being processed.

Figure 14:
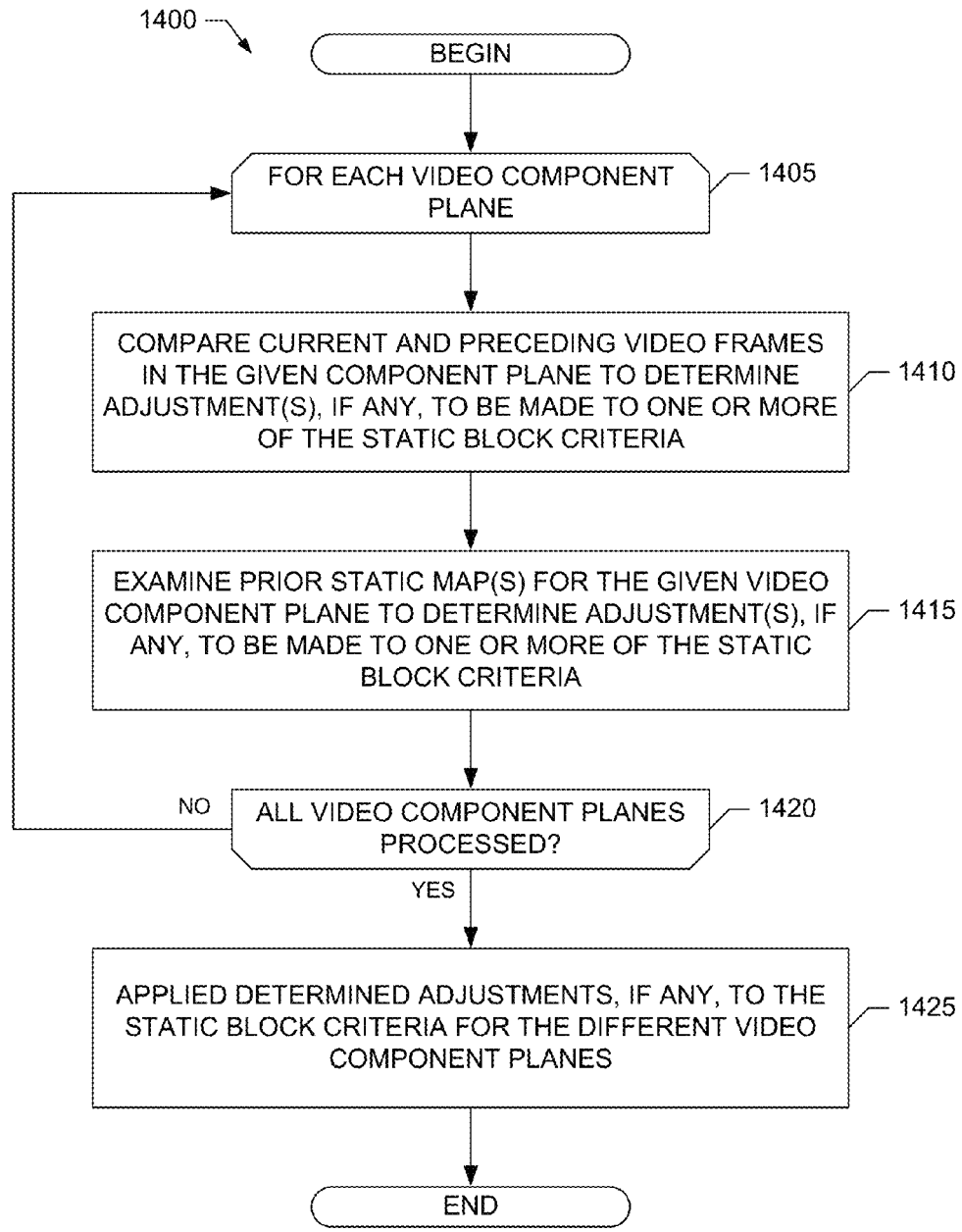
FIG. 14 is a flowchart representative of example machine readable instructions that may be executed to implement the example static block criteria adjuster of FIG. 8, and/or static block criteria adjustment in the example static region detector of FIGS. 1 and/or 4.

An example program 1400 that may be executed to implement the example static block criteria adjuster 445 of FIGS. 4 and/or 8 is represented by the flowchart shown in FIG. 14. With reference to the preceding figures and associated written descriptions, the example program 1400 of FIG. 14 begins execution at block 1405 at which the static block criteria adjuster 445 of the static region detector 115 is configured to evaluate a given video component plane (e.g., the luminance plane or one of the chrominance planes) of the current video frame being processed. At block 1410, the example phase plane correlator 805 of the static block criteria adjuster 445 compares region(s) of the current and preceding video frames of the input video sequence 105 to determine adjustment(s), if any, to be made to one or more of the static block detection criteria evaluated by the static block criteria evaluator 410, as described above. At block 1415, the example static map hysteresis evaluator 810 of the static block criteria adjuster 445 examines one or more prior static maps determined for one or more prior video frames in the input video sequence 105 to determine adjustment(s), if any, to be made to one or more of the static block detection criteria evaluated by the static block criteria evaluator 410, as described above. At block 1420, the static block criteria adjuster 445 causes processing to continue until evaluation of all video component planes is complete. Then, at block 1425, the example static block criteria adjustment specifier 815 applies, as described above, the adjustment(s), if any, to be made to one or more of the static block detection criteria based on the results obtained at blocks 1410 and/or 1415.

Figure 15:
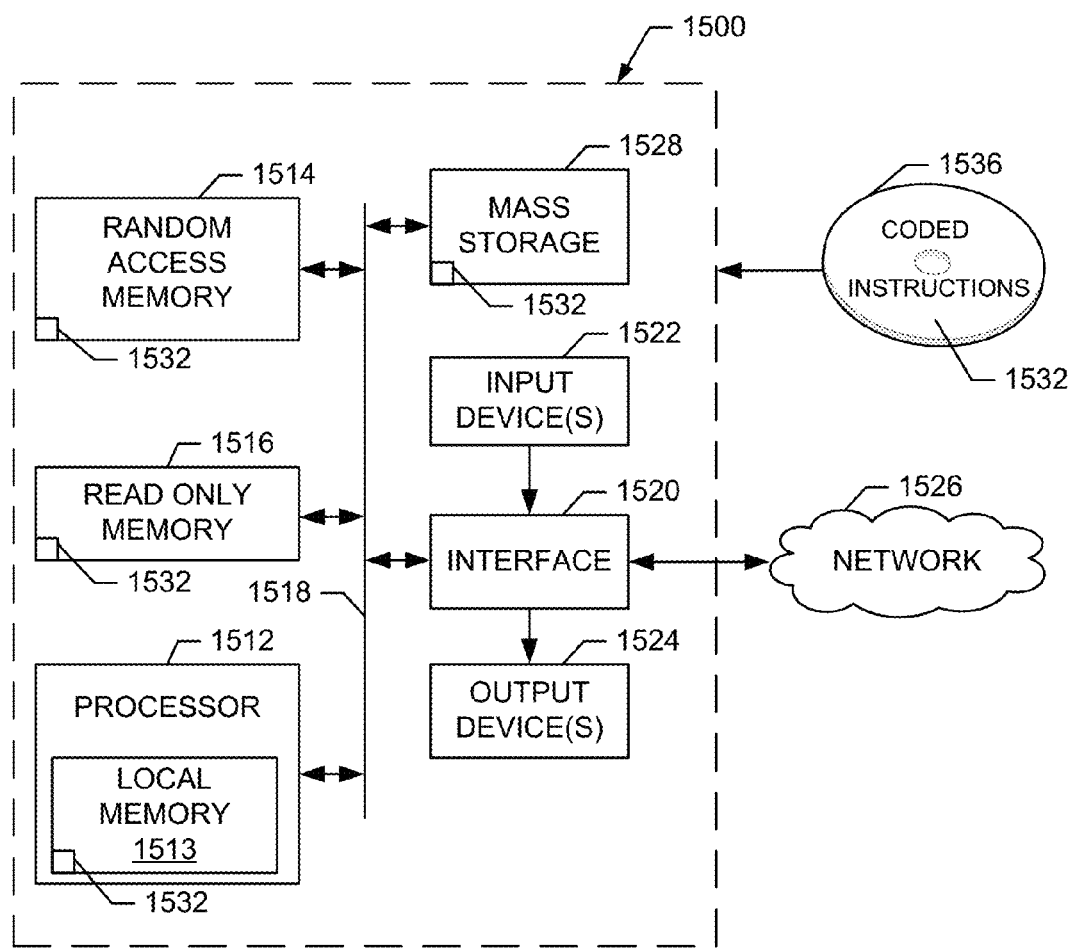
FIG. 15 is a block diagram of an example processor platform that may execute the example machine readable instructions of FIGS. 11-13 and/or 14 to implement the example video processing system of FIG. 1, the example static region detector of FIGS. 1 and/or 4, the example static block criteria evaluator of FIG. 6, the example static block criteria adjuster of FIG. 8 and/or the example static map combiner of FIG. 9.

FIG. 15 is a block diagram of an example processor platform 1500 capable of executing the instructions of FIGS. 11-14 to implement the example video processing system 100, the example static region detector 115, the example frame rate upconverter 120, the example motion estimator 125, the example video segmenter 405, the example static block criteria evaluator 410, the example static map creator 415, the example static map storage 420, the example static map combiner 425, the example media filter 430, the example static region identifier 435, the example static region verifier 440, the example static block criteria adjuster 445, the example per-block pixel comparator 605, the example edge map creator 610, the example per-block edge counter 615, the example per-block edge correspondence evaluator 620, the example evaluation combiner 625, the example phase plane correlator 805, the example static map hysteresis evaluator 810, the example static block criteria adjustment specifier 815, the example intra-component static map combiner 905 and/or the example inter-component static map combiner 910 of FIGS. 1-10. The processor platform 1500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer.

The processor 1512 of the illustrated example includes a local memory 1513 (e.g., a cache). The processor 1512 of the illustrated example is in communication with a main memory including a volatile memory 1514 and a non-volatile memory 1516 via a link 1518. The link 1518 may be implemented by a bus, one or more point-to-point connections, etc., or a combination thereof. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1500, can allow the user to control the computer system and provide data to the computer using physical gestures, such as, but not limited to, hand or body movements, facial expressions, and face recognition.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID (redundant array of independent disks) systems, and digital versatile disk (DVD) drives.

Coded instructions 1532 corresponding to the instructions of FIGS. 11-14 may be stored in the mass storage device 1528, in the volatile memory 1514, in the non-volatile memory 1516, in the local memory 1513 and/or on a removable tangible computer readable storage medium, such as a CD or DVD 1536.

The following further examples include subject matter such as a method to perform block-based static region detection for video processing, means for performing block-based static region detection for video processing, at least one machine-readable medium including instructions that, when performed by a machine cause the machine to perform block-based static region detection for video processing, an apparatus and/or a system to implement block-based static region detection for video processing are disclosed herein.

Example 1 is a video processing method including segmenting pixels in a first frame of a video sequence into a first plurality of pixel blocks. The method of example 1 also includes processing, with a processor, the first plurality of pixel blocks and a second plurality of pixel blocks corresponding to a prior second frame of the video sequence to create, based on a first criterion, a map identifying one or more static pixel blocks in the first plurality of pixel blocks. The method of example 1 further includes identifying, based on the map, a static region in the first frame of the video sequence.

Example 2 includes the subject matter of example 1, wherein the processing includes evaluating the first plurality of pixel blocks and the second plurality of pixel blocks based on the first criterion to determine a first static block identification result, evaluating the first plurality of pixel blocks and the second plurality of pixel blocks based on a second criterion to determine a second static block identification result, and combining the first and second static block identification results to create the map identifying the one or more static pixel blocks in the first plurality of pixel blocks.

Example 3 includes the subject matter of example 1, wherein the first criterion includes a sum of absolute differences criterion, and the processing includes computing a sum of absolute differences between pixels in a first pixel block of the first plurality of pixel blocks and corresponding pixels in a corresponding second pixel block of the second plurality of pixel blocks, and determining whether the first pixel block is a static block by comparing the sum of absolute differences to a threshold.

Example 4 includes the subject matter of example 1, wherein the first criterion includes an edge count criterion, and the processing includes determining an edge map identifying edges in the first frame of the video sequence, counting a number of pixels in a first pixel block of the first plurality of pixel blocks associated with the edges identified in the edge map, and determining whether the first pixel block is a static block by comparing the number to a threshold.

Example 5 includes the subject matter of example 1, wherein the first criterion includes an edge correspondence criterion, and the processing includes determining a first edge map identifying edges in the first frame of the video sequence, identifying first edge pixels in a first pixel block of the first plurality of pixel blocks, the first edge pixels being associated with the edges identified in the first edge map, determining a number first edge pixels not having edge correspondence with respective second edge pixels in a corresponding second pixel block of the second plurality of pixel blocks, two edge pixels having edge correspondence when the two edge pixels have a same frame location and are associated with a same edge orientation, and determining whether the first pixel block is a static block by comparing the number to a threshold.

Example 6 includes the subject matter of example 1, wherein the first frame has multiple video components, the first plurality of pixel blocks is associated with a first video component plane, the map is a first map, and further including segmenting the pixels in the first frame of the video sequence into a third plurality of pixel blocks associated with a second video component plane different from the first video component plane. Example 6 also includes processing the third plurality of pixel blocks and a fourth plurality of pixel blocks corresponding to the second video component plane of the prior second frame of the video sequence to create, based on the first criterion, a second map identifying one or more static pixel blocks in the third plurality of pixel blocks. Example 6 further includes identifying, based on the first and second maps, the static region in the first frame of the video sequence.

Example 7 includes the subject matter of example 6, wherein identifying, based on the first and second maps, the static region in the first frame of the video sequence includes combining the first map and the second map to determine an overall map identifying one or more static pixel blocks in the first frame of the video sequence.

Example 8 includes the subject matter of example 1, wherein the map is a first map, and further including. Example 8 also includes segmenting the pixels in the first frame of the video sequence into a third plurality of pixel blocks, ones of the third plurality of pixel blocks partially overlapping ones of the first plurality of blocks. Example 8 also includes processing the third plurality of pixel blocks and a fourth plurality of pixel blocks corresponding to the prior second frame of the video sequence to create, based on the first criterion, a second map identifying one or more static pixel blocks in the third plurality of pixel blocks, ones of the fourth plurality of pixel blocks partially overlapping ones of the second plurality of blocks. Example 8 further includes identifying, based on the first and second maps, the static region in the first frame of the video sequence.

Example 9 includes the subject matter of example 8, wherein identifying, based on the first and second maps, the static region in the first frame of the video sequence includes combining the first map and the second map to determine an overall map identifying one or more static pixel sub-blocks in the first frame of the video sequence, a first sub-block in the first frame being included in a first one of the first plurality of pixel blocks and a first one of the third plurality of blocks, the overall map having finer resolution than the first and second blocks. Example 9 also includes identifying the static region in the first frame of the video sequence based on the overall map.

Example 10 includes the subject matter of example 1, wherein the map is a first map, and further including adjusting the first criterion based on at least one of (1) a determined correlation between the first and second frames of the video sequence, or (2) evaluation of a prior second map identifying one or more static pixel blocks in the second plurality of pixel blocks corresponding to the prior second frame of the video sequence.

Example 11 is a method as defined in any one of claims 1 to 5, wherein the map is a first map, and further including adjusting the first criterion based on at least one of (1) a determined correlation between the first and second frames of the video sequence, or (2) evaluation of a prior second map identifying one or more static pixel blocks in the second plurality of pixel blocks corresponding to the prior second frame of the video sequence.

Example 12 is at least one tangible machine readable storage medium including machine readable instructions which, when executed, cause a machine to at least segment pixels in a first frame of a video sequence into a first plurality of pixel blocks. The instructions of example 12, when executed, also cause the machine to at least process the first plurality of pixel blocks and a second plurality of pixel blocks corresponding to a prior second frame of the video sequence to create, based on a first criterion, a map identifying one or more static pixel blocks in the first plurality of pixel blocks. The instructions of example 12, when executed, further cause the machine to at least identify, based on the map, a static region in the first frame of the video sequence.

Example 13 includes the subject matter of example 12, wherein the machine readable instructions, when executed, further cause the machine to evaluate the first plurality of pixel blocks and the second plurality of pixel blocks based on the first criterion to determine a first static block identification result, evaluate the first plurality of pixel blocks and the second plurality of pixel blocks based on a second criterion to determine a second static block identification result, and combine the first and second static block identification results to create the map identifying the one or more static pixel blocks in the first plurality of pixel blocks.

Example 14 includes the subject matter of example 12, wherein the first criterion includes a sum of absolute differences criterion, and the machine readable instructions, when executed, further cause the machine to compute a sum of absolute differences between pixels in a first pixel block of the first plurality of pixel blocks and corresponding pixels in a corresponding second pixel block of the second plurality of pixel blocks, and determine whether the first pixel block is a static block by comparing the sum of absolute differences to a threshold.

Example 15 includes the subject matter of example 12, wherein the first criterion includes an edge count criterion, and the machine readable instructions, when executed, further cause the machine to determine an edge map identifying edges in the first frame of the video sequence, count a number of pixels in a first pixel block of the first plurality of pixel blocks associated with the edges identified in the edge map, and determine whether the first pixel block is a static block by comparing the number to a threshold.

Example 16 includes the subject matter of example 12, wherein the first criterion includes an edge correspondence criterion, and the machine readable instructions, when executed, further cause the machine to determine a first edge map identifying edges in the first frame of the video sequence, identify first edge pixels in a first pixel block of the first plurality of pixel blocks, the first edge pixels being associated with the edges identified in the first edge map, determine a number first edge pixels not having edge correspondence with respective second edge pixels in a corresponding second pixel block of the second plurality of pixel blocks, two edge pixels having edge correspondence when the two edge pixels have a same frame location and are associated with a same edge orientation, and determine whether the first pixel block is a static block by comparing the number to a threshold.

Example 17 includes the subject matter of example 12, wherein the first frame has multiple video components, the first plurality of pixel blocks is associated with a first video component plane, the map is a first map, and the machine readable instructions, when executed, further cause the machine to segment the pixels in the first frame of the video sequence into a third plurality of pixel blocks associated with a second video component plane different from the first video component plane, process the third plurality of pixel blocks and a fourth plurality of pixel blocks corresponding to the second video component plane of the prior second frame of the video sequence to create, based on the first criterion, a second map identifying one or more static pixel blocks in the third plurality of pixel blocks, and identify, based on the first and second maps, the static region in the first frame of the video sequence.

Example 18 includes the subject matter of example 17, wherein the machine readable instructions, when executed, further cause the machine to combine the first map and the second map to determine an overall map identifying one or more static pixel blocks in the first frame of the video sequence.

Example 19 includes the subject matter of example 12, wherein the map is a first map, and the machine readable instructions, when executed, further cause the machine to segment the pixels in the first frame of the video sequence into a third plurality of pixel blocks, ones of the third plurality of pixel blocks partially overlapping ones of the first plurality of blocks, process the third plurality of pixel blocks and a fourth plurality of pixel blocks corresponding to the prior second frame of the video sequence to create, based on the first criterion, a second map identifying one or more static pixel blocks in the third plurality of pixel blocks, ones of the fourth plurality of pixel blocks partially overlapping ones of the second plurality of blocks, and identify, based on the first and second maps, the static region in the first frame of the video sequence.

Example 20 includes the subject matter of example 19, wherein the machine readable instructions, when executed, further cause the machine to combine the first map and the second map to determine an overall map identifying one or more static pixel sub-blocks in the first frame of the video sequence, a first sub-block in the first frame being included in a first one of the first plurality of pixel blocks and a first one of the third plurality of blocks, the overall map having finer resolution than the first and second blocks, and identify the static region in the first frame of the video sequence based on the overall map.

Example 21 includes the subject matter of example 12, wherein the map is a first map, and the machine readable instructions, when executed, further cause the machine to adjust the first criterion based on at least one of (1) a determined correlation between the first and second frames of the video sequence, or (2) evaluation of a prior second map identifying one or more static pixel blocks in the second plurality of pixel blocks corresponding to the prior second frame of the video sequence.

Example 22 includes the subject matter of example of any one of examples 12 to 16, wherein the map is a first map, and the machine readable instructions, when executed, further cause the machine to adjust the first criterion based on at least one of (1) a determined correlation between the first and second frames of the video sequence, or (2) evaluation of a prior second map identifying one or more static pixel blocks in the second plurality of pixel blocks corresponding to the prior second frame of the video sequence.

Example 23 is at least one tangible machine readable storage medium including machine readable instructions which, when executed, cause a machine to perform a method as defined in any one of examples 1 to 11.

Example 24 is a video processing apparatus including a segmenter to segment pixels in a first frame of a video sequence into a first plurality of pixel blocks. The apparatus of example 24 also includes an evaluator to evaluate the first plurality of pixel blocks and a second plurality of pixel blocks corresponding to a second frame of the video sequence prior to the first frame based on a first criterion to determine one or more static pixel blocks in the first plurality of pixel blocks. The apparatus of example 24 further includes a map creator to create a map identifying the one or more static pixel blocks determined by the evaluator to be in the first plurality of pixel blocks. The apparatus of example 24 additionally includes an identifier to identify, based on the map, a static region in the first frame of the video sequence.

Example 25 includes the subject matter of example 24 wherein the evaluator is to evaluate the first plurality of pixel blocks and the second plurality of pixel blocks based on the first criterion to determine a first static block identification result, and evaluate the first plurality of pixel blocks and the second plurality of pixel blocks based on a second criterion to determine a second static block identification result. In example 25, the map creator is to combine the first and second static block identification results to create the map identifying the one or more static pixel blocks in the first plurality of pixel blocks.

Example 26 includes the subject matter of example 24, wherein the first criterion includes a sum of absolute differences criterion, and the evaluator is to compute a sum of absolute differences between pixels in a first pixel block of the first plurality of pixel blocks and corresponding pixels in a corresponding second pixel block of the second plurality of pixel blocks, and determine whether the first pixel block is a static block by comparing the sum of absolute differences to a threshold.

Example 27 includes the subject matter of example 24, wherein the first criterion includes an edge count criterion, and the evaluator is to determine an edge map identifying edges in the first frame of the video sequence, count a number of pixels in a first pixel block of the first plurality of pixel blocks associated with the edges identified in the edge map, and determine whether the first pixel block is a static block by comparing the number to a threshold.

Example 28 includes the subject matter of example 24, wherein the first criterion includes an edge correspondence criterion, and the evaluator is to determine a first edge map identifying edges in the first frame of the video sequence, identify first edge pixels in a first pixel block of the first plurality of pixel blocks, the first edge pixels being associated with the edges identified in the first edge map, determine a number first edge pixels not having edge correspondence with respective second edge pixels in a corresponding second pixel block of the second plurality of pixel blocks, two edge pixels having edge correspondence when the two edge pixels have a same frame location and are associated with a same edge orientation, and determine whether the first pixel block is a static block by comparing the number to a threshold.

Example 29 includes the subject matter of example 24, wherein the first frame has multiple video components, the first plurality of pixel blocks is associated with a first video component plane, the map is a first map, and the segmenter is further to segment the pixels in the first frame of the video sequence into a third plurality of pixel blocks associated with a second video component plane different from the first video component plane. In example 29, the evaluator is further to evaluate the third plurality of pixel blocks and a fourth plurality of pixel blocks corresponding to the second video component plane of the prior second frame of the video sequence based on the first criterion to determine one or more static pixel blocks in the third plurality of pixel blocks. In example 29, the map creator is further to create a second map identifying the one or more static pixel blocks determined by the evaluator to be in the third plurality of pixel blocks. In example 29, the identifier is to identify, based on the first and second maps, the static region in the first frame of the video sequence.

Example 30 includes the subject matter of example 29, and further includes a map combiner to combine the first map and the second map to determine an overall map identifying one or more static pixel blocks in the first frame of the video sequence.

Example 31 includes the subject matter of example 24, wherein the map is a first map, and the segmenter is further to segment the pixels in the first frame of the video sequence into a third plurality of pixel blocks, ones of the third plurality of pixel blocks partially overlapping ones of the first plurality of blocks. In example 31, the evaluator is further to evaluate the third plurality of pixel blocks and a fourth plurality of pixel blocks corresponding to the prior second frame of the video sequence based on the first criterion to determine one or more static pixel blocks in the third plurality of pixel blocks, ones of the fourth plurality of pixel blocks partially overlapping ones of the second plurality of blocks. In example 31, the map creator is further to create a second map identifying the one or more static pixel blocks determined by the evaluator to be in the third plurality of pixel blocks. In example 31, the identifier is further to identify, based on the first and second maps, the static region in the first frame of the video sequence.

Example 32 includes the subject matter of example 31, and further includes a map combiner to combine the first map and the second map to determine an overall map identifying one or more static pixel sub-blocks in the first frame of the video sequence, a first sub-block in the first frame being included in a first one of the first plurality of pixel blocks and a first one of the third plurality of blocks, the overall map having finer resolution than the first and second blocks. In example 32, the identifier is to identify the static region in the first frame of the video sequence based on the overall map.

Example 33 includes the subject matter of example 24, wherein the map is a first map, and further including a criteria adjuster to adjust the first criterion based on at least one of (1) a determined correlation between the first and second frames of the video sequence, or (2) evaluation of a prior second map identifying one or more static pixel blocks in the second plurality of pixel blocks corresponding to the prior second frame of the video sequence.

Example 34 includes the subject matter of any one of examples 24 to 28, wherein the map is a first map, and further including a criteria adjuster to adjust the first criterion based on at least one of (1) a determined correlation between the first and second frames of the video sequence, or (2) evaluation of a prior second map identifying one or more static pixel blocks in the second plurality of pixel blocks corresponding to the prior second frame of the video sequence.

Example 35 is an apparatus including a processor configured to perform a method as defined in any one of examples 1 to 11.

Example 36 is a video processing system including means for segmenting pixels in a first frame of a video sequence into a first plurality of pixel blocks. The system of example 36 also includes means for processing the first plurality of pixel blocks and a second plurality of pixel blocks corresponding to a prior second frame of the video sequence to create, based on a first criterion, a map identifying one or more static pixel blocks in the first plurality of pixel blocks. The system of example 36 further includes means for identifying, based on the map, a static region in the first frame of the video sequence.

Example 37 includes the subject matter of example 36, wherein the processing means includes means for evaluating the first plurality of pixel blocks and the second plurality of pixel blocks based on the first criterion to determine a first static block identification result, means for evaluating the first plurality of pixel blocks and the second plurality of pixel blocks based on a second criterion to determine a second static block identification result, and means for combining the first and second static block identification results to create the map identifying the one or more static pixel blocks in the first plurality of pixel blocks.

Example 38 includes the subject matter of example 36, wherein the first criterion includes a sum of absolute differences criterion, and the processing means includes means for computing a sum of absolute differences between pixels in a first pixel block of the first plurality of pixel blocks and corresponding pixels in a corresponding second pixel block of the second plurality of pixel blocks, means for determining whether the first pixel block is a static block by comparing the sum of absolute differences to a threshold.

Example 39 includes the subject matter of example 36, wherein the first criterion includes an edge count criterion, and the processing means includes means for determining an edge map identifying edges in the first frame of the video sequence, means for counting a number of pixels in a first pixel block of the first plurality of pixel blocks associated with the edges identified in the edge map, and means for determining whether the first pixel block is a static block by comparing the number to a threshold.

Example 40 includes the subject matter of example 36, wherein the first criterion includes an edge correspondence criterion, and the processing means includes means for determining a first edge map identifying edges in the first frame of the video sequence, means for identifying first edge pixels in a first pixel block of the first plurality of pixel blocks, the first edge pixels being associated with the edges identified in the first edge map, means for determining a number first edge pixels not having edge correspondence with respective second edge pixels in a corresponding second pixel block of the second plurality of pixel blocks, two edge pixels having edge correspondence when the two edge pixels have a same frame location and are associated with a same edge orientation, and means for determining whether the first pixel block is a static block by comparing the number to a threshold.

Example 41 includes the subject matter of example 36, wherein the first frame has multiple video components, the first plurality of pixel blocks is associated with a first video component plane, the map is a first map, and further including means for segmenting the pixels in the first frame of the video sequence into a third plurality of pixel blocks associated with a second video component plane different from the first video component plane. Example 41 also includes means for processing the third plurality of pixel blocks and a fourth plurality of pixel blocks corresponding to the second video component plane of the prior second frame of the video sequence to create, based on the first criterion, a second map identifying one or more static pixel blocks in the third plurality of pixel blocks. Example 41 additionally includes means for identifying, based on the first and second maps, the static region in the first frame of the video sequence.

Example 42 includes the subject matter of example 41, wherein the means for identifying, based on the first and second maps, the static region in the first frame of the video sequence includes means for combining the first map and the second map to determine an overall map identifying one or more static pixel blocks in the first frame of the video sequence.

Example 43 includes the subject matter of example 36, wherein the map is a first map, and further including means for segmenting the pixels in the first frame of the video sequence into a third plurality of pixel blocks, ones of the third plurality of pixel blocks partially overlapping ones of the first plurality of blocks. Example 43 also includes means for processing the third plurality of pixel blocks and a fourth plurality of pixel blocks corresponding to the prior second frame of the video sequence to create, based on the first criterion, a second map identifying one or more static pixel blocks in the third plurality of pixel blocks, ones of the fourth plurality of pixel blocks partially overlapping ones of the second plurality of blocks. Example 43 additionally includes means for identifying, based on the first and second maps, the static region in the first frame of the video sequence.

Example 44 includes the subject matter of example 43, wherein the means for identifying, based on the first and second maps, the static region in the first frame of the video sequence includes means for combining the first map and the second map to determine an overall map identifying one or more static pixel sub-blocks in the first frame of the video sequence, a first sub-block in the first frame being included in a first one of the first plurality of pixel blocks and a first one of the third plurality of blocks, the overall map having finer resolution than the first and second blocks. Example 44 also includes means for identifying the static region in the first frame of the video sequence based on the overall map.

Example 45 includes the subject matter of example 36, wherein the map is a first map, and further including means for adjusting the first criterion based on at least one of (1) a determined correlation between the first and second frames of the video sequence, or (2) evaluation of a prior second map identifying one or more static pixel blocks in the second plurality of pixel blocks corresponding to the prior second frame of the video sequence.

Example 46 is a system as defined in any one of claims 36 to 40, wherein the map is a first map, and further including means for adjusting the first criterion based on at least one of (1) a determined correlation between the first and second frames of the video sequence, or (2) evaluation of a prior second map identifying one or more static pixel blocks in the second plurality of pixel blocks corresponding to the prior second frame of the video sequence.

Example 47 is a system including means for performing a method as defined in any one of examples 1 to 11.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A video processing method comprising:
segmenting pixels in a first frame of a video sequence into a first plurality of pixel blocks;
processing, with a processor, the first plurality of pixel blocks and a second plurality of pixel blocks corresponding to a prior second frame of the video sequence to create, based on a first criterion, a map identifying one or more static pixel blocks in the first plurality of pixel blocks; and
identifying, based on the map, a static region in the first frame of the video sequence.

2. A method as defined in claim 1, wherein the processing includes:
evaluating the first plurality of pixel blocks and the second plurality of pixel blocks based on the first criterion to determine a first static block identification result;
evaluating the first plurality of pixel blocks and the second plurality of pixel blocks based on a second criterion to determine a second static block identification result; and
combining the first and second static block identification results to create the map identifying the one or more static pixel blocks in the first plurality of pixel blocks.

3. A method as defined in claim 1, wherein the first criterion includes a sum of absolute differences criterion, and the processing includes:
computing a sum of absolute differences between pixels in a first pixel block of the first plurality of pixel blocks and corresponding pixels in a corresponding second pixel block of the second plurality of pixel blocks; and
determining whether the first pixel block is a static block by comparing the sum of absolute differences to a threshold.

4. A method as defined in claim 1, wherein the first criterion includes an edge count criterion, and the processing includes:
determining an edge map identifying edges in the first frame of the video sequence;
counting a number of pixels in a first pixel block of the first plurality of pixel blocks associated with the edges identified in the edge map; and
determining whether the first pixel block is a static block by comparing the number to a threshold.

5. A method as defined in claim 1, wherein the first criterion includes an edge correspondence criterion, and the processing includes:
determining a first edge map identifying edges in the first frame of the video sequence;
identifying first edge pixels in a first pixel block of the first plurality of pixel blocks, the first edge pixels being associated with the edges identified in the first edge map;
determining a number of first edge pixels not having edge correspondence with respective second edge pixels in a corresponding second pixel block of the second plurality of pixel blocks, two edge pixels having edge correspondence when the two edge pixels have a same frame location and are associated with a same edge orientation; and
determining whether the first pixel block is a static block by comparing the number to a threshold.

6. A method as defined in claim 1, wherein the first frame has multiple video components, the first plurality of pixel blocks is associated with a first video component plane, the map is a first map, and further including:
segmenting the pixels in the first frame of the video sequence into a third plurality of pixel blocks associated with a second video component plane different from the first video component plane;
processing the third plurality of pixel blocks and a fourth plurality of pixel blocks corresponding to the second video component plane of the prior second frame of the video sequence to create, based on the first criterion, a second map identifying one or more static pixel blocks in the third plurality of pixel blocks; and
identifying, based on the first and second maps, the static region in the first frame of the video sequence.

7. A method as defined in claim 6, wherein the identifying, based on the first and second maps, of the static region in the first frame of the video sequence includes combining the first map and the second map to determine an overall map identifying one or more static pixel blocks in the first frame of the video sequence.

8. A method as defined in claim 1, wherein the map is a first map, and further including:
segmenting the pixels in the first frame of the video sequence into a third plurality of pixel blocks, ones of the third plurality of pixel blocks partially overlapping ones of the first plurality of blocks;
processing the third plurality of pixel blocks and a fourth plurality of pixel blocks corresponding to the prior second frame of the video sequence to create, based on the first criterion, a second map identifying one or more static pixel blocks in the third plurality of pixel blocks, ones of the fourth plurality of pixel blocks partially overlapping ones of the second plurality of blocks; and
identifying, based on the first and second maps, the static region in the first frame of the video sequence.

9. A method as defined in claim 8, wherein the identifying, based on the first and second maps, of the static region in the first frame of the video sequence includes:
combining the first map and the second map to determine an overall map identifying one or more static pixel sub-blocks in the first frame of the video sequence, a first sub-block in the first frame being included in a first one of the first plurality of pixel blocks and a first one of the third plurality of blocks, the overall map having finer resolution than the first and second blocks; and
identifying the static region in the first frame of the video sequence based on the overall map.

10. A method as defined in claim 1, wherein the map is a first map, and further including adjusting the first criterion based on at least one of (1) a determined correlation between the first and second frames of the video sequence, or (2) evaluation of a prior second map identifying one or more static pixel blocks in the second plurality of pixel blocks corresponding to the prior second frame of the video sequence.

11. At least one tangible machine readable storage medium comprising machine readable instructions which, when executed, cause a machine to at least:
segment pixels in a first frame of a video sequence into a first plurality of pixel blocks;
process the first plurality of pixel blocks and a second plurality of pixel blocks corresponding to a prior second frame of the video sequence to create, based on a first criterion, a map identifying one or more static pixel blocks in the first plurality of pixel blocks; and
identify, based on the map, a static region in the first frame of the video sequence.

12. At least one storage medium as defined in claim 11, wherein the machine readable instructions, when executed, further cause the machine to:

evaluate the first plurality of pixel blocks and the second plurality of pixel blocks based on the first criterion to determine a first static block identification result;

evaluate the first plurality of pixel blocks and the second plurality of pixel blocks based on a second criterion to determine a second static block identification result; and combine the first and second static block identification results to create the map identifying the one or more static pixel blocks in the first plurality of pixel blocks.

13. At least one storage medium as defined in claim 11, wherein the first criterion includes a sum of absolute differences criterion, and the machine readable instructions, when executed, further cause the machine to:

compute a sum of absolute differences between pixels in a first pixel block of the first plurality of pixel blocks and corresponding pixels in a corresponding second pixel block of the second plurality of pixel blocks; and determine whether the first pixel block is a static block by comparing the sum of absolute differences to a threshold.

14. At least one storage medium as defined in claim 11, wherein the first criterion includes an edge count criterion, and the machine readable instructions, when executed, further cause the machine to:

determine an edge map identifying edges in the first frame of the video sequence;

count a number of pixels in a first pixel block of the first plurality of pixel blocks associated with the edges identified in the edge map; and determine whether the first pixel block is a static block by comparing the number to a threshold.

15. At least one storage medium as defined in claim 11, wherein the first criterion includes an edge correspondence criterion, and the machine readable instructions, when executed, further cause the machine to:

determine a first edge map identifying edges in the first frame of the video sequence;

identify first edge pixels in a first pixel block of the first plurality of pixel blocks, the first edge pixels being associated with the edges identified in the first edge map;

determine a number of first edge pixels not having edge correspondence with respective second edge pixels in a corresponding second pixel block of the second plurality of pixel blocks, two edge pixels having edge correspondence when the two edge pixels have a same frame location and are associated with a same edge orientation; and determine whether the first pixel block is a static block by comparing the number to a threshold.

16. A video processing apparatus comprising:

a segmenter to segment pixels in a first frame of a video sequence into a first plurality of pixel blocks;

an evaluator to evaluate the first plurality of pixel blocks and a second plurality of pixel blocks corresponding to a second frame of the video sequence prior to the first frame based on a first criterion to determine one or more static pixel blocks in the first plurality of pixel blocks;

a map creator to create a map identifying the one or more static pixel blocks determined by the evaluator to be in the first plurality of pixel blocks; and an identifier to identify, based on the map, a static region in the first frame of the video sequence.

17. An apparatus as defined in claim 16 wherein:

the evaluator is to:

evaluate the first plurality of pixel blocks and the second plurality of pixel blocks based on the first criterion to determine a first static block identification result; and evaluate the first plurality of pixel blocks and the second plurality of pixel blocks based on a second criterion to determine a second static block identification result; and the map creator is to combine the first and second static block identification results to create the map identifying the one or more static pixel blocks in the first plurality of pixel blocks.

18. An apparatus as defined in claim 16, wherein the first criterion includes a sum of absolute differences criterion, and the evaluator is to:

compute a sum of absolute differences between pixels in a first pixel block of the first plurality of pixel blocks and corresponding pixels in a corresponding second pixel block of the second plurality of pixel blocks; and determine whether the first pixel block is a static block by comparing the sum of absolute differences to a threshold.

19. An apparatus as defined in claim 16, wherein the first criterion includes an edge count criterion, and the evaluator is to:

determine an edge map identifying edges in the first frame of the video sequence;

count a number of pixels in a first pixel block of the first plurality of pixel blocks associated with the edges identified in the edge map; and determine whether the first pixel block is a static block by comparing the number to a threshold.

20. An apparatus as defined in claim 16, wherein the first criterion includes an edge correspondence criterion, and the evaluator is to:

determine a first edge map identifying edges in the first frame of the video sequence;

identify first edge pixels in a first pixel block of the first plurality of pixel blocks, the first edge pixels being associated with the edges identified in the first edge map;

determine a number of first edge pixels not having edge correspondence with respective second edge pixels in a corresponding second pixel block of the second plurality of pixel blocks, two edge pixels having edge correspondence when the two edge pixels have a same frame location and are associated with a same edge orientation; and determine whether the first pixel block is a static block by comparing the number to a threshold.

21. A video processing system comprising:

memory including computer readable instructions; and a processor to execute the instructions to perform operations including:

segmenting pixels in a first frame of a video sequence into a first plurality of pixel blocks;

processing the first plurality of pixel blocks and a second plurality of pixel blocks corresponding to a prior second frame of the video sequence to create, based on a first criterion, a map identifying one or more static pixel blocks in the first plurality of pixel blocks; and identifying, based on the map, a static region in the first frame of the video sequence.

22. A system as defined in claim 21, wherein the first frame has multiple video components, the first plurality of pixel blocks is associated with a first video component plane, the map is a first map, and the operations performed by the processor further include:

segmenting the pixels in the first frame of the video sequence into a third plurality of pixel blocks associated with a second video component plane different from the first video component plane;

processing the third plurality of pixel blocks and a fourth plurality of pixel blocks corresponding to the second video component plane of the prior second frame of the video sequence to create, based on the first criterion, a second map identifying one or more static pixel blocks in the third plurality of pixel blocks; and identifying, based on the first and second maps, the static region in the first frame of the video sequence.

23. A system as defined in claim 21, wherein the map is a first map, and the operations performed by the processor further include:

segmenting the pixels in the first frame of the video sequence into a third plurality of pixel blocks, ones of the third plurality of pixel blocks partially overlapping ones of the first plurality of blocks;

processing the third plurality of pixel blocks and a fourth plurality of pixel blocks corresponding to the prior second frame of the video sequence to create, based on the first criterion, a second map identifying one or more static pixel blocks in the third plurality of pixel blocks, ones of the fourth plurality of pixel blocks partially overlapping ones of the second plurality of blocks; and identifying, based on the first and second maps, the static region in the first frame of the video sequence.

24. A system as defined in claim 23, wherein the identifying, based on the first and second maps, of the static region in the first frame of the video sequence includes:

combining the first map and the second map to determine an overall map identifying one or more static pixel sub-blocks in the first frame of the video sequence, a first sub-block in the first frame being included in a first one of the first plurality of pixel blocks and a first one of the third plurality of blocks, the overall map having finer resolution than the first and second blocks; and identifying the static region in the first frame of the video sequence based on the overall map.

25. A system as defined in claim 21, wherein the map is a first map, and the operations performed by the processor further include adjusting the first criterion based on at least one of (1) a determined correlation between the first and second frames of the video sequence, or (2) evaluation of a prior second map identifying one or more static pixel blocks in the second plurality of pixel blocks corresponding to the prior second frame of the video sequence.

* * * * *